US010144514B2

(12) United States Patent  
Rajasingham

(10) Patent No.: US 10,144,514 B2  
(45) Date of Patent: Dec. 4, 2018

(54) VEHICLE OCCUPANT SUPPORT

(71) Applicant: Arjuna Indraeswaran Rajasingham, Bethesda, MD (US)

(72) Inventor: Arjuna Indraeswaran Rajasingham, Bethesda, MD (US)

(*) Notice: Subject to any disclaimer, the term of this patent is extended or adjusted under 35 U.S.C. 154(b) by 277 days.

(21) Appl. No.: 14/852,593

(22) Filed: Sep. 13, 2015

(65) Prior Publication Data

US 2016/0009397 A1 Jan. 14, 2016

Related U.S. Application Data

(63) Continuation-in-part of application No. 13/138,183, filed as application No. PCT/US2010/000237 on Jan. 28, 2010, now Pat. No. 9,174,555, application No. 14/852,593, which is a continuation-in-part of application No. 14/210,413, filed on Mar. 13, 2014, now Pat. No. 9,428,088, which is a continuation of application No. 12/735,146, filed as application No. PCT/US2009/000342 on Jan. 21, 2009, now Pat. No. 8,763,954, application No. 14/852,593, which is a continuation-in-part of application No. 13/820,510, filed on Mar. 2, 2013, now Pat. No. 9,358,908, and a continuation-in-part of application No. 14/375,673, filed as application No. PCT/US2013/000024 on Jan. 31, 2013, now Pat. No. 9,868,416.

(60) Provisional application No. 61/206,205, filed on Jan. 28, 2009, provisional application No. 61/208,445, filed on Feb. 24, 2009, provisional application No. 61/211,191, filed on Mar. 27, 2009, provisional application No. 61/214,672, filed on Apr. 27, 2009, provisional application No. 61/215,559, filed on May 7, 2009, provisional application No. 61/270,808, filed on Jul. 14, 2009, provisional application No. 61/276,298, filed on Sep. 9, 2009, provisional application No. 61/062,002, filed on Jan. 23, 2008, provisional application No. 61/066,372, filed on Feb. 20, 2008, provisional application No. 61/072,241, filed on Mar. 28, 2008, provisional application No. 61/062,495, filed on Jan. 28, 2008, provisional application No. 61/123,345, filed on Apr. 8, 2008, provisional application No. 61/188,175, filed on Aug. 7, 2008, provisional application No. 61/191,309, filed on Sep. 8, 2008, provisional application No. 61/198,541, filed on Nov. 6, 2008, provisional application No. 61/632,797, filed on Jan. 31, 2012, provisional application No. 61/685,537, filed on Mar. 20, 2012, provisional application No. 61/686,316, (Continued)

(51) Int. Cl.
*B64D 11/06* (2006.01)
*B64D 11/00* (2006.01)

(52) U.S. Cl.
CPC ........ *B64D 11/0601* (2014.12); *B64D 11/003* (2013.01); *B64D 11/0627* (2014.12)

(58) Field of Classification Search
CPC .............. B64D 11/003; B64D 11/0601; B64D 11/0602; B64D 11/0604; B64D 11/0627; B64D 11/0636; B64D 11/064; B64D 11/0643; B64D 11/0648; B64D 2011/0046; B64D 2011/0069; B64D 2011/0076; B64D 2011/0084; B64D 2011/0092

See application file for complete search history.

(56) References Cited

U.S. PATENT DOCUMENTS 5,716,026 A * 2/1998 Pascasio ............ B64D 11/0601
244/118.6
6,237,872 B1 * 5/2001 Bar-Levav ......... B64D 11/0601
244/118.6

(Continued)

*Primary Examiner* — Richard R Green

(57) ABSTRACT

Occupant support for enhanced comfort safety and utility.

10 Claims, 20 Drawing Sheets

Related U.S. Application Data filed on Apr. 3, 2012, provisional application No. 61/688,591, filed on May 17, 2012, provisional application No. 61/688,855, filed on May 23, 2012, provisional application No. 61/744,431, filed on Sep. 26, 2012, provisional application No. 61/797,175, filed on Dec. 1, 2012, provisional application No. 61/797,639, filed on Dec. 12, 2012, provisional application No. 61/848,724, filed on Jan. 10, 2013.

(56) References Cited

U.S. PATENT DOCUMENTS

| | | | |
|---|---|---|---|
| 6,494,536 B2 * | 12/2002 | Plant | B64D 11/064 297/284.11 |
| 7,240,943 B2 * | 7/2007 | Williamson | B60R 7/043 244/118.6 |
| 7,448,575 B2 * | 11/2008 | Cheung | B64D 11/064 244/118.6 |
| 8,118,365 B2 * | 2/2012 | Henshaw | B64D 11/0601 297/245 |
| 2012/0074751 A1 * | 3/2012 | De La Garza | B64D 11/0641 297/354.13 |
| 2013/0328361 A1 * | 12/2013 | Egan | B64D 11/0636 297/188.01 |
| 2014/0300162 A1 * | 10/2014 | Udriste | B64D 11/064 297/340 |
| 2015/0166183 A1 * | 6/2015 | Henshaw | B64D 11/0601 244/118.6 |
| 2016/0144963 A1 * | 5/2016 | Gregoire | B64D 11/0601 244/118.6 |

* cited by examiner

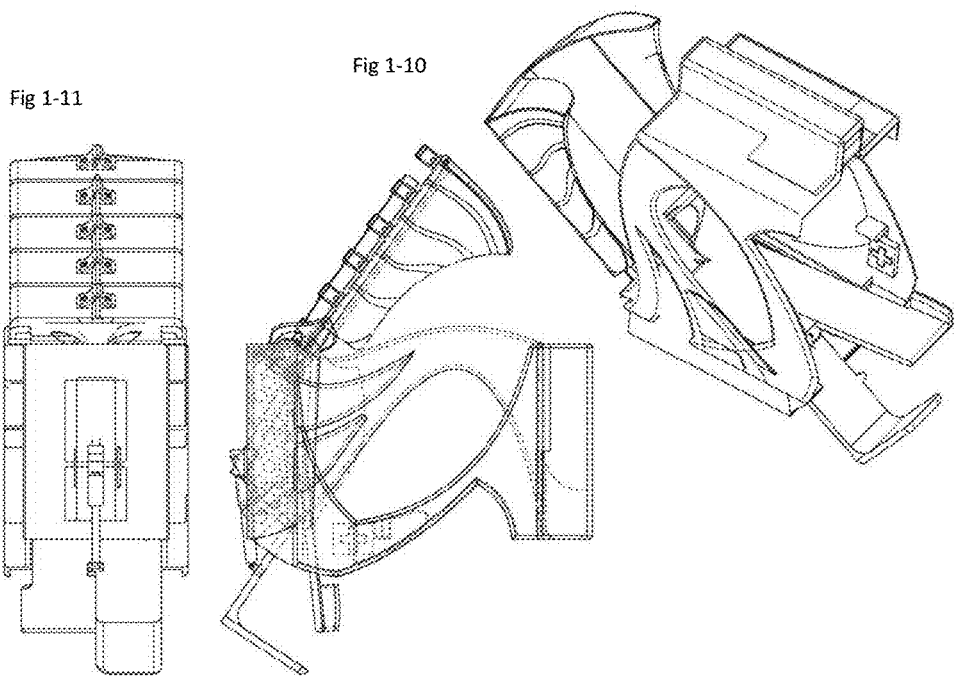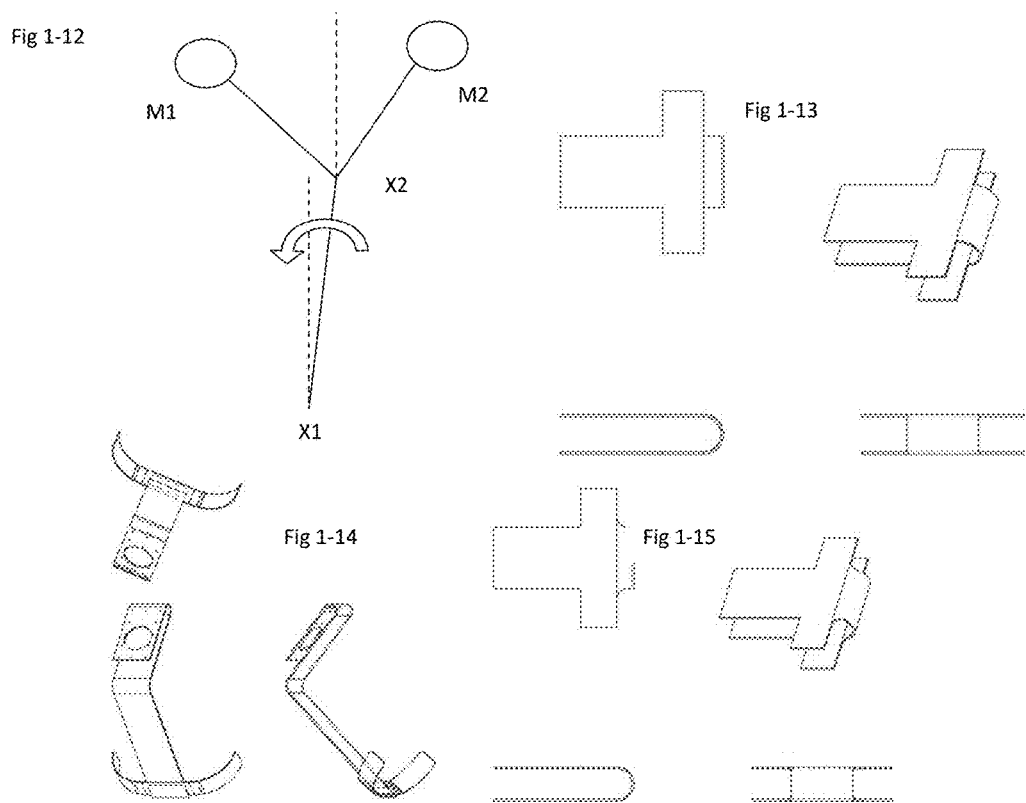

16A
16B
16C
16D

- Dial handle
- innermost spring/damper (may be single/double/multi-helix)
- middle layer spring/damper (may be single helix, double helix or a multiple helix for stability)
- outer spring/damper (may be single helix, double helix or a multiple helix for stability)
- support ring attached to outer shell/cage Fig 2-4
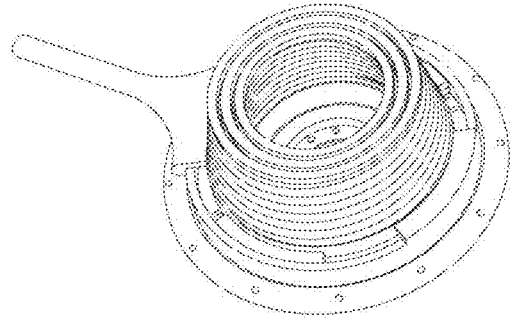
Fig 2-5
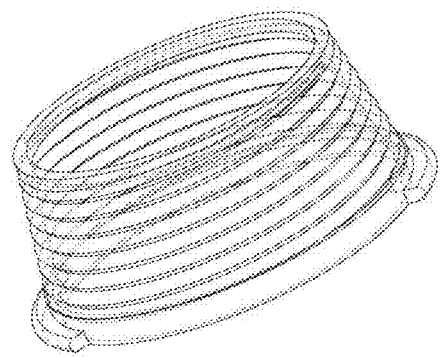
Double helix spring damper
Fig 2-6
Fig 2-5A
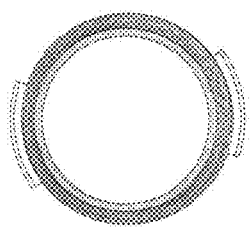
Double Helix Spring Damper
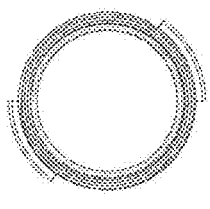
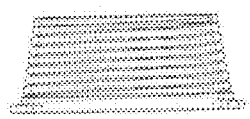
Single helix spring damper
Fig 2-7
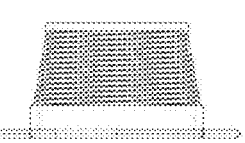
Quad helix spring damper ( has quad flanges also in this embodiment)
Fig 2-8
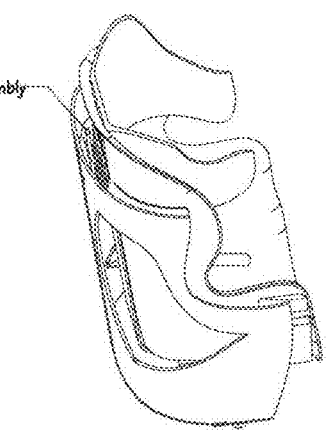
Dial Resistanc assembly Fig 3-6
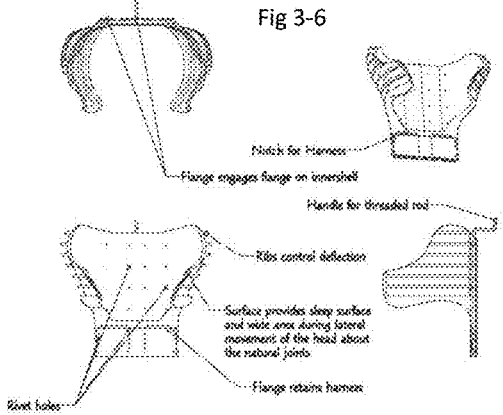
Fig 3-7
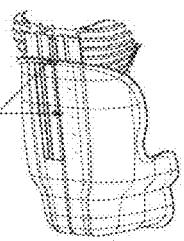
Fig 3-8
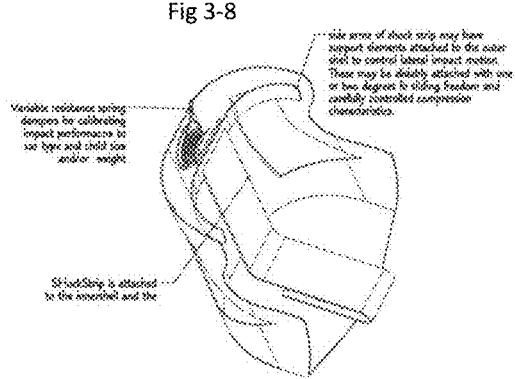
Fig 3-9
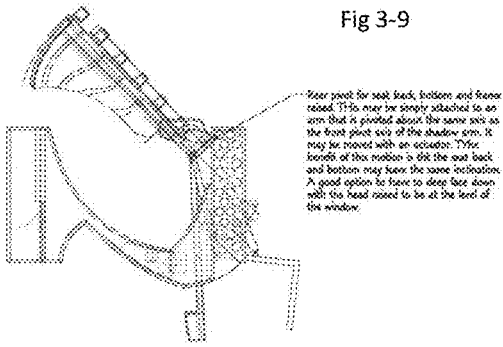
Fig 3-10
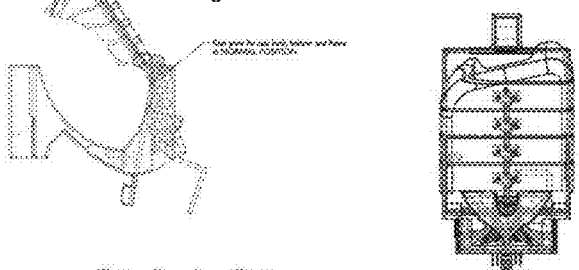
Fig 4-1
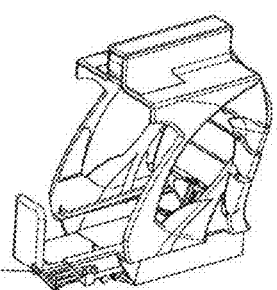
Extending Leg Rest
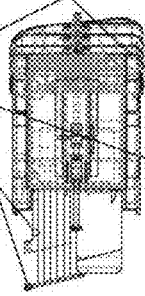
Seat Bottom with LegRest having guides /slots for the extending LegRest
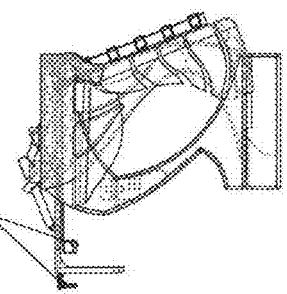

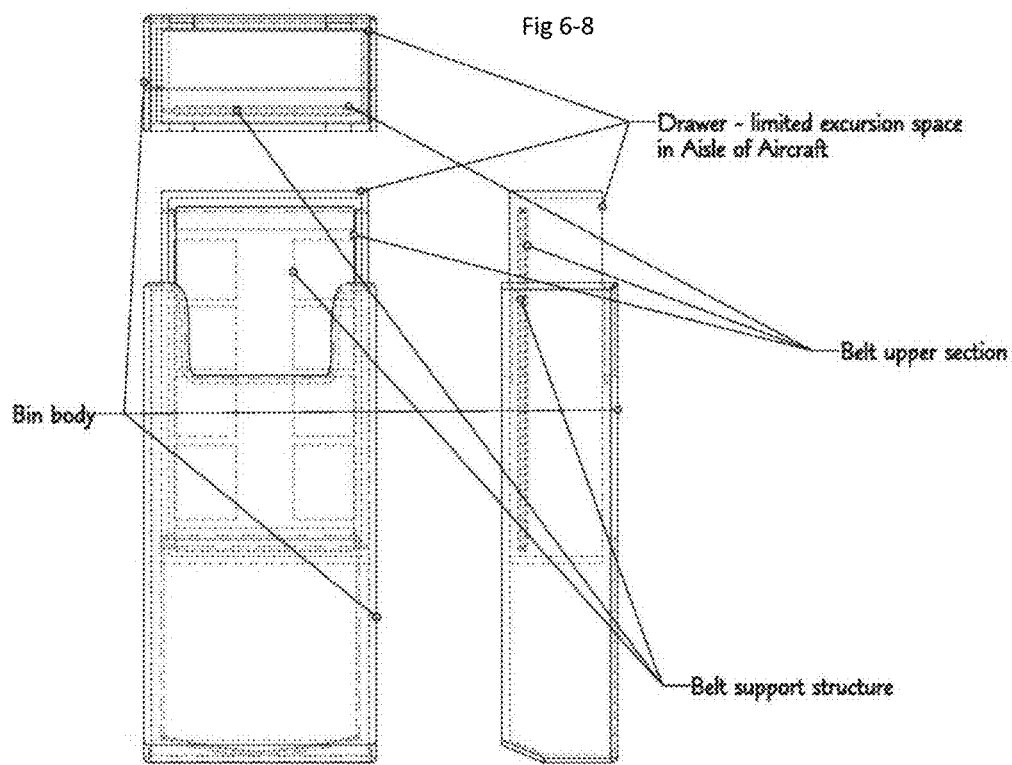
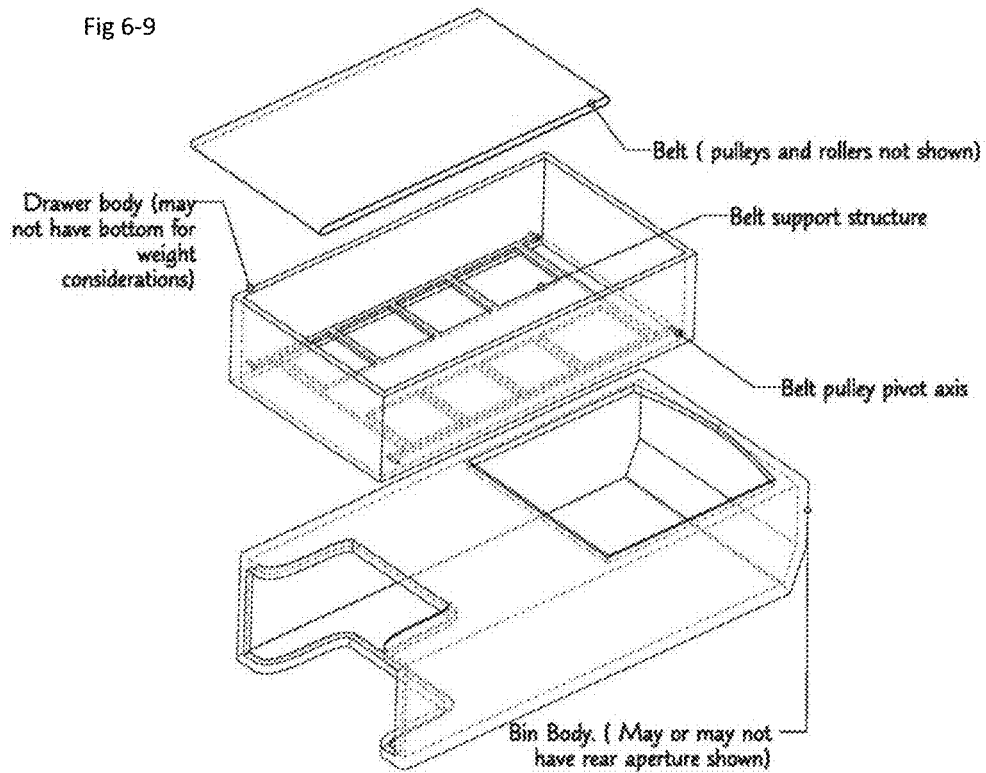

VEHICLE OCCUPANT SUPPORT

PRIORITY REFERENCES

The following applications are hereby incorporated herein by reference: Ser. No. 13/138,183; PCT/US2010/000237; 61/206,205; 61/208,445; 61/211,191; 61/214,672; 61/215,559; 61/270,808; 61/276,298; PCT/US2009/000342; 61/062,002; 61/066,372; 61/072,241; 61/062,495; 61/123,345; 61/188,175; 61/191,309; 61/198,541; Ser. Nos. 14/210,413; 12/735,146; 13/820,510; PCT/US2011/001547; Ser. Nos. 13/138,183; 12/735,146; 61/402,751; 61/404,335; 61/458,997; 61/459,689; 61/460,266; 61/465,160; Ser. No. 14/375,673; PCT/US2013/000024; 61/632,797; 61/685,537; 61/686,316; 61/688,591; 61/688,855; 61/744,431; 61/797,175; 61/797,639; 61/848,724.

SUMMARY

The present invention provides a new structure and passenger transport paradigm for accommodating passengers in a vehicle with particular attention paid to safety, utility and provides new features for utility.

BRIEF DESCRIPTION OF DRAWINGS

FIG. 1-12, 1-16 shows embodiments of a WorkMate.

FIG. 1-13 shows an enhanced shock strip for the child seat support as disclosed in PCT application filed Jan. 21, 2009. This modified structure reduces distortion of the sections that are attached to the inner shell of the seat and the outer frame of shell. Another version of the Shock Strip similar to one previously disclosed is in FIG. 1-14. This has in addition the extensions to the upper end of the seat for further support. FIG. 1-15 shows a variation of FIG. 1-13 where the edges of the curved section are modified to change the twist and bend parameters of the Shock Strip.

FIGS. 2-1 to 2-10 show another form of Bunge Sling that is made up of concentric spring dampers. The type of Bunge sling may have a variable resistance "dialed in" with the dial handle by engaging different numbers of Spring Dampers as required that may be dependent on parameters related to the physical size of the child and/or the properties of the pulse at the mounting location of the child seat in a front impact. The latter may vary depending on the crumple zone and other factors of the car.

The Fig shows three concentric spring dampers. However there is no limit on the number except for the space for installation. With more spring dampers there are more options to tune the arrangement for a different load characteristics. Each of the spring dampers may have a single helix as in a coil spring but may also be a double helix or even a multi-helix for greater stability of the end rings and the connection points to the stretching spring damper coils. The taper of the spring dampers will lower the possibility of slight lateral movements affecting the stretching of inner coils relative to non-stretching (and unselected) outer coils. the dial handle is attached to a lock ring that slides on the support ring (engaged with rear flanges to the retaining ring in this embodiment) and thereby with its lock flange engages one or more of the spring damper flanges which are designed to have an arc length that includes a section under the lock flange at the dial positions where retention and engagement of the that spring damper is desired. Some of the flanges of the spring dampers are therefore longer arcs than others and they are designed to allow some spring dampers to move freely when the others are engaged by the lock flanges.

Figure 1:
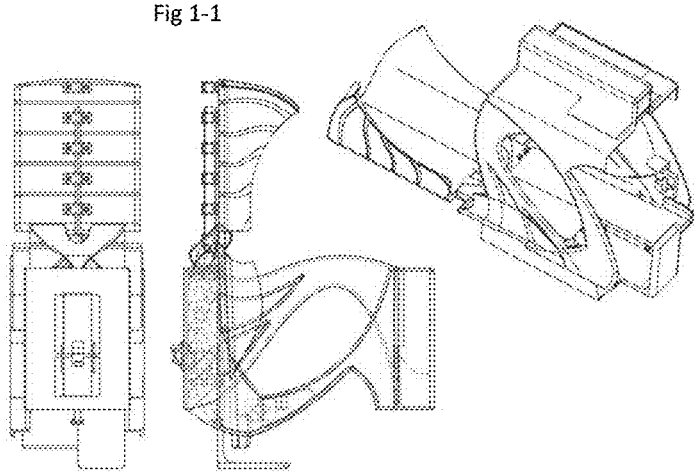
FIGS. 1-1 to 1-11 show a variation of embodiments disclosed in the Air Sleeper invention as in any of the documents disclosed herein by reference. It has a side mounted leg rest.
Figures 1, 2:
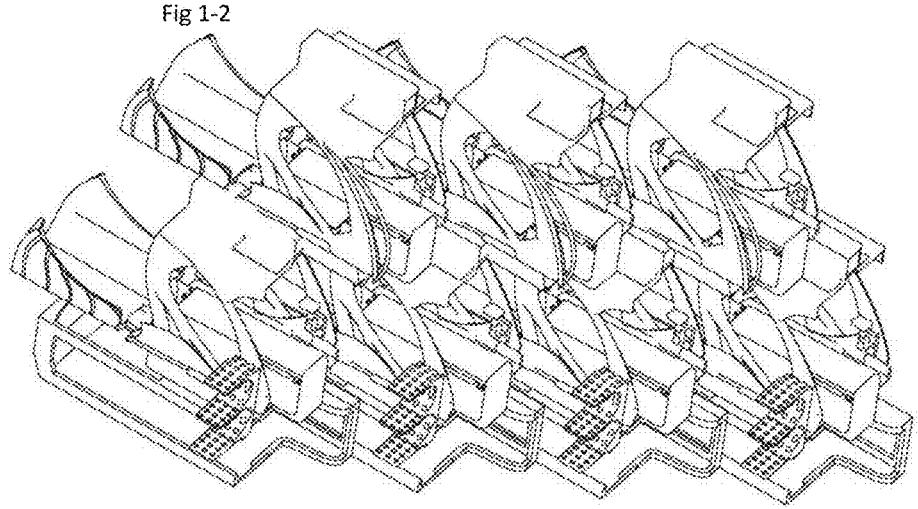

FIG. 2-1 shows three orthogonal views.

FIG. 2-2 shows an exploded view, the monotonically decreasing arc lengths of the spring dampers are designed to allow the lock flange to lock 1, 2, or all 3 of the flanges.

Figures 1, 2, 3:
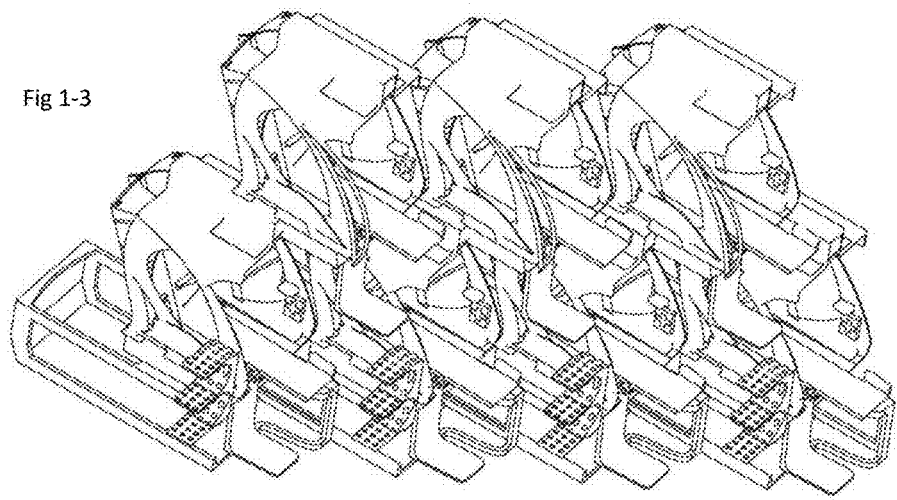

FIG. 2-3 shows a cross section of a double-helix structure with 3 spring dampers. It also shows the retention of the lock ring with the support ring and the nested spring dampers attached thereto. The support ring may be fabricated in two parts to be then assembled over the Lock ring. If inner rear flanges are used between the lock ring and the support ring as shown the retaining section over the inner flange of the lock ring may be a separate part that is riveted on with the remaining body of the support flange. This can of course be done for the retaining sections of the outer and inner rear flanges that hold down the lock ring.

Figures 1, 2, 3, 4:
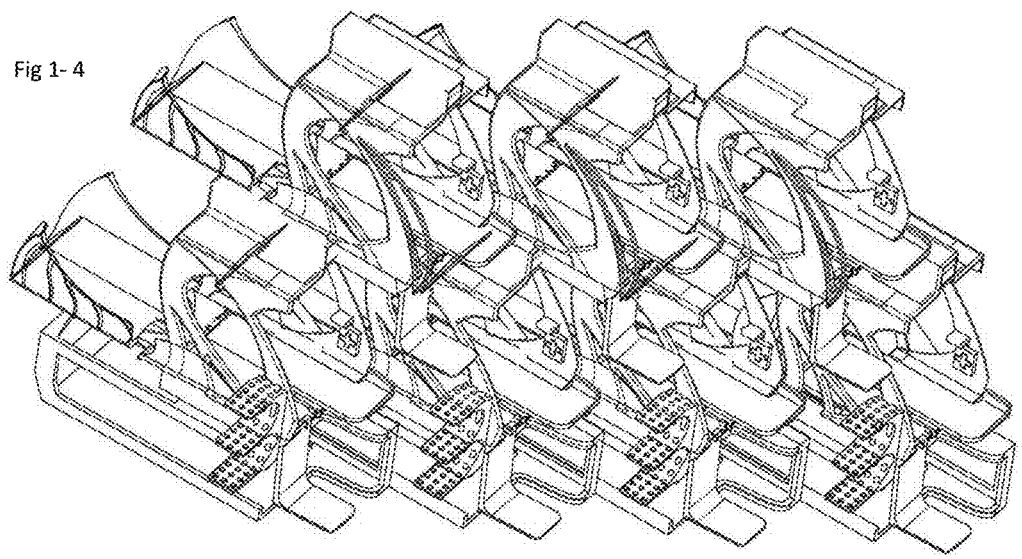

FIG. 2-4 shows an isometric view of the Dialed resistance Bunge Sling arrangement.

FIG. 2-5, 5A show a double helix embodiment of a single spring damper element.

FIG. 2-6 shows a single helix embodiment of a single spring damper element.

FIG. 2-7 shows a quad-helix embodiment of a spring damper for a single spring damper element. This figure also shows two pairs of flanges. multiple pairs of flanges may be used but must correspond to the flanges of the lock flange.

FIG. 2-8 shows an embodiment of the Dial resistance bunge sling arrangement, attached (laterally slidably and engaging for front impact, or fixed) to the inner shell on the inner side and at the back with the support ring to the safety cage or outer shell. The outer end in some embodiments may also be directly mounted on the seat support structure.

FIG. 2-9 shows an exploded view of the parts of the assembly—in this case using the inner shell with a shock strip which is attached to the bunge arrangement that is in turn attached to the outer shell or the safety cage.

FIG. 2-10, shows the detail (Bunge slot exploded away for clarity) of one possible embodiment of the detachably attached bunge slot that attached to the bunge pin that is firmly attached to the spring dampers. In the normal position the bunge pin sits inside the bunge slot but not inside the depression. In the event of a lateral movement of the rear of the inner seat shell (attached to the Bunge slot) as for example in a side impact, the pin slides out of the slot. However, in the event of a front impact the pin stays in the slot and further may embed into the depression for further stability. Some embodiments may have the Pin head spring loaded away from the depression to minimize the chances of the slot impeding the lateral motion of the pin during vibration etc that may displace the pin slightly.

FIGS. 2-11 to 2-14 show the shock strip in some embodiments of the child seat. The lower flange is attached to the safety cage or outer shell or frame, the inner contour of the strip hugs the inner shell and the side arms go around it. There are support points on the ends of the "T" that allow controlled sliding of these ends relative to the Safety Cage or outer shell. The embodiments may or may not have the Bunge sling arrangements.

FIG. 2-11, shows a side impact condition.

FIG. 2-12 shows a front impact condition with a looped front edge.

FIG. 2-13, shows a front impact with a simple front "hair pin" bend.

FIG. 2-14 shows another looped front end for a front impact.

FIGS. 3-1 to 3-8 show different parts of a Child support mechanism or child seat for a vehicle. These embodiments may also be used as a module in an existing child seat base.

FIG. 3-1 shows the Side wings of a head rest that are contoured, with the arrangement for sliding the headrest up and down and the slots for the harness on the headrest. The Bunge sling arrangement (round form) may also be seen between the inner and outer shells.

FIG. 3-2 shows an exploded view with the flanges for support of the headrest and the harness and also the parts of the dial controlled bunge sling.

FIGS. 3-3 to 3-8 show details of various parts of the headrest and inner shell assemblies as annotated in the drawings. FIG. 3-9 shows an embodiment of the Air Sleeper, wherein the rear pivot for the seat back, bottom and frame can be raised from the normal position of the pivot as shown in FIG. 3-10.

FIG. 4-1, illustrates an embodiment of the Air Sleeper with an extending leg rest. This leg rest slides in guides on the Seat Bottom that has a leg rest (the seat bottom may not have a leg rest in some embodiments and the extending leg rest can slide in the seat bottom on guides)

FIG. 4-2, shows the seat bottom with a leg rest with guides for the extending leg rest. It also shows a pin that protrudes from the extending leg rest through a slot in the seat bottom and leg rest. This pin is adapted to engage a near vertical slot in the fixed support structure of the Air Sleeper. It can slide up and down that slot. Moreover that slot can be in some embodiments have a variable inclination to change the horizontal movement of the pin as the vertical position of the seat bottom with leg rest is changed.

Figures 1, 2, 3, 4, 5:
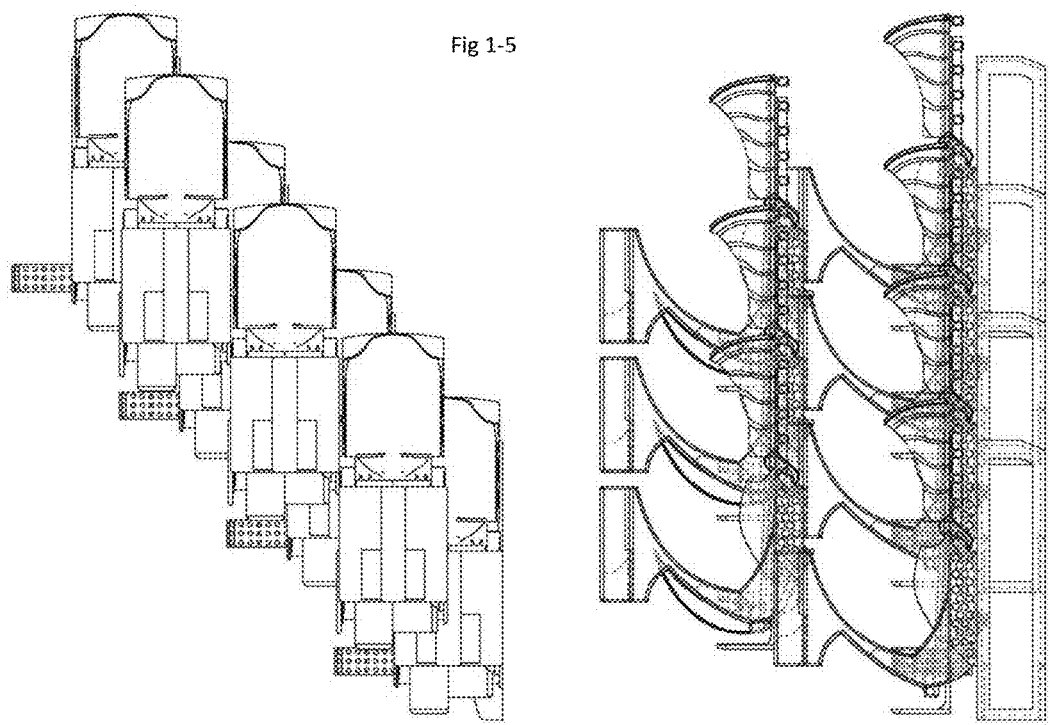

FIG. 5-1 shows the Side wings of a head rest that are contoured, with the arrangement for sliding the headrest up and down and the slots for the harness on the headrest. The Bunge sling arrangement (round form)—also called a Bunge Device, may also be seen between the inner and outer shells. Notably there is space between the inner and outer shells. This space is used for differential movement of the inner shell with regard to the outer shell and the vehicle during impact conditions.

Figures 1, 2, 3, 4, 5, 6:
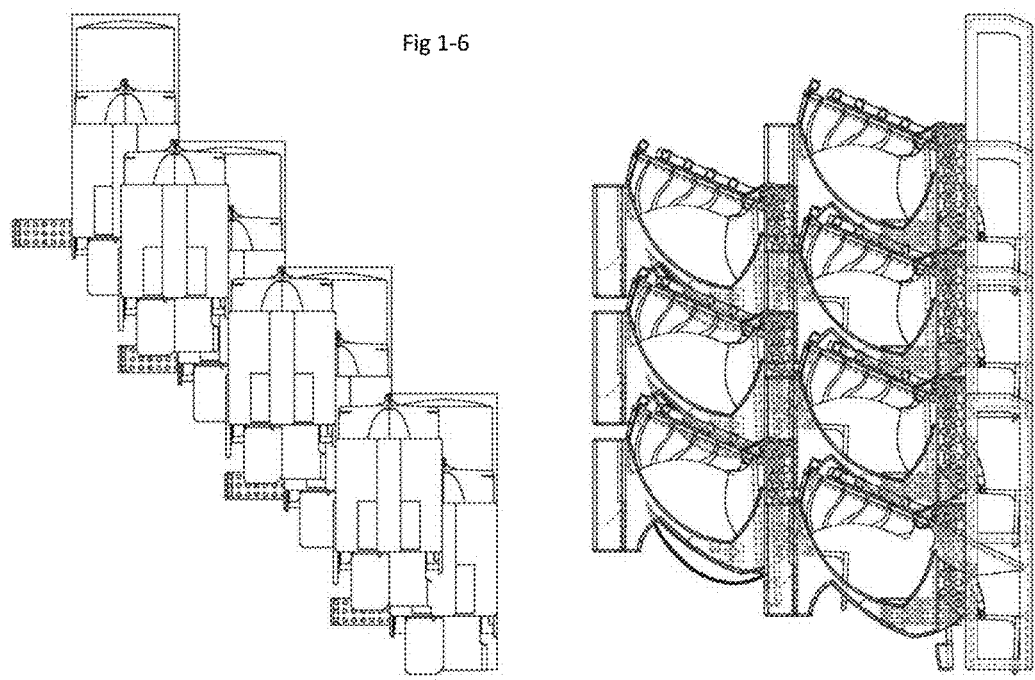

FIG. 6-1, shows a head rest that in this embodiment has a harness mount also attached. This embodiment is enabled to slide up and down to accommodate a growing child. Shown in the figure are the Aircushions (see for example U.S. Pat. No. 7,154,416, U.S. Pat. No. 6,609,749) that in this embodiment are contoured to have their primary vents at the lower end near the bottom. Secondary vents may be placed anywhere on the aircushions. Placing the primary vents near the bottom evacuate the lower side of the Aircushions first because of the fluid dynamics following compression and therefore maintain more air or other fluid in the upper sections thereby ensconcing the head i.e. having the outer/ top edges of the air cushions protrude more than the center and bottom of the aircushions that evacuate first.

FIG. 6-2, Aircushions for the head rest shown on their own. The primary vents in this embodiment are shown at the bottom of each cushion. In addition there may be venturi tubes attached to the tapered sections of the air cushions (not shown) that could modify the airflow characteristics during deflation.

FIG. 6-3, Shows an embodiment of an integrated headrest and shoulder guard that is able to slide up and down on the CRS thereby allowing height adjustment of these elements as the child grows. The Harness attachment is also on this movable element. The shoulder guard may be braced on its side with other elements of the CRS. If the CRS has a dynamic inner shell and a static or fixed outer shell, the headrest/shoulder guard may be braced to the inner shell and thereby benefit from the dynamics of the inner shell.

The Fig shows an embodiment of Aircushions on the headrest (only one shown but more can be added below the one shown) attached to a sacrificial chamber/airbag (see for example U.S. Pat. No. 7,154,416, U.S. Pat. No. 6,609,749) that provides inflow into the air cushion at the time the shoulder compresses the sacrificial chamber or airbag. This embodiment has the air ducted to the head or top of the Aircushion so that, that region fills up and evacuates through the bottom of the aircushion. Notably such ducting will provide more fluid at the top of the aircushion to ensconce the head. Moreover there can be multiple sacrificial airbags each connected to one or more micro air cushions. While it is possible to connect multiple sacrificial airbags to each air cushion such embodiments may not be that common. Either or both of the Aircushions and the sacrificial airbag may be partially or fully filled with porous materials.

FIG. 6-4, shows the single set of sacrificial airbags on the shoulder support and the corresponding aircushion on the head rest. The position of the air duct may be seen clearly from this figure. Notably however, other embodiments may have the air duct connected to any part of the aircushion.

FIG. 6-5, shows another embodiment of the headrest/ shoulder guard with air cushions and sacrificial airbags. This embodiment shows a single sacrificial airbag on each side feeding two air cushions. Here again the air duct leads to the top of the air cushions. Such embodiments can have multiple aircushions feeding from the same sacrificial airbags.

FIG. 6-6 shows the same aircushion/sacrificial airbag system of FIG. 6-5. The air ducts lead to the top of the aircushions and the aircushions vent at their bottom. There can of course be secondary vents anywhere on the air cushions for controlling the evacuation of the micro aircushions further.

Figures 1, 2, 3, 4, 5, 6, 7:
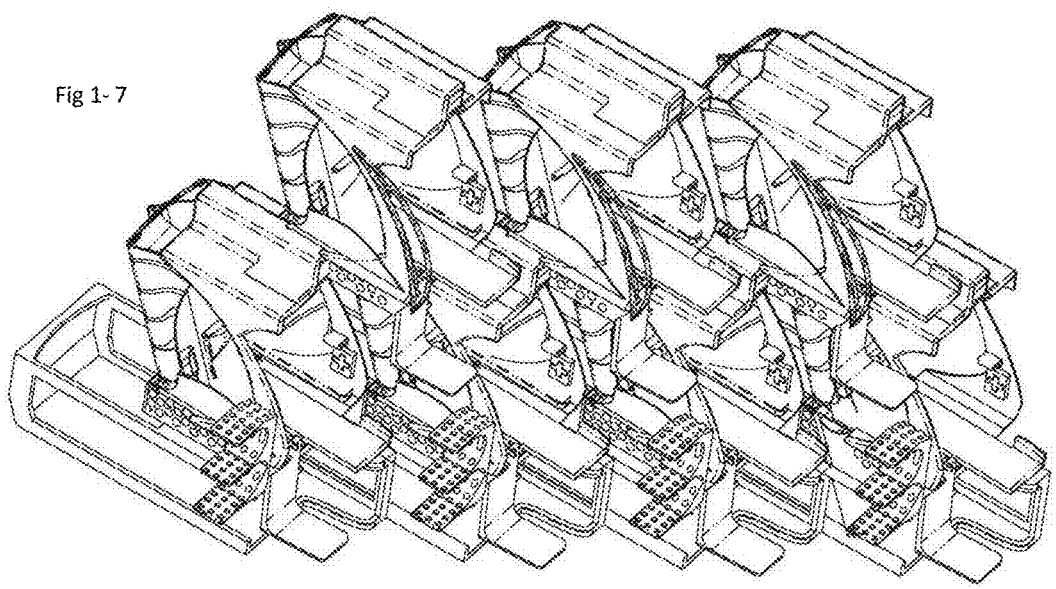

FIG. 6-7, shows a method for construction of the air cushions and/or sacrificial airbags. The fig shows the aircushions/airbags filled partially or fully with a porous material that forms the shape. The aircushions/airbags are sandwiched between layers that form the walls and a formed die in the shape of the intervening spaces is used to compress the walls in the intervening spaces to weld together the wall material that is itself weld able with the resulting pressure or hat that is applied at the time of compression, or is treated with an adhesive to provide adhesion between the walls at the time of compression.

Another related approach is to simply sandwich a layer of the porous material, wherein the porous material has special characteristics that allow welding of the two wall layers to itself under the weld conditions that may be heat and/or pressure. It may also be treated or coated with an adhesive to provide this function, the advantage of this second approach is that there is no need for the cut outs of the porous material before assembly. All the forming information is in the die shape. Notably the pair of dies will ensure that the resulting airbag/air cushion will take the shape of the headrest and/or the shoulder guard so that it can be inserted and fixed to these members easily. Finally for the Air ducts that may not require porous materials a tube may be inserted as a former to keep the shape of the walls ahead of compression. Such tubes (possibly with porous walls) may also be used in the body of the airbags/air cushions to modify the direction fluid flow.

Figures 1, 2, 3, 4, 5, 6, 7, 8:
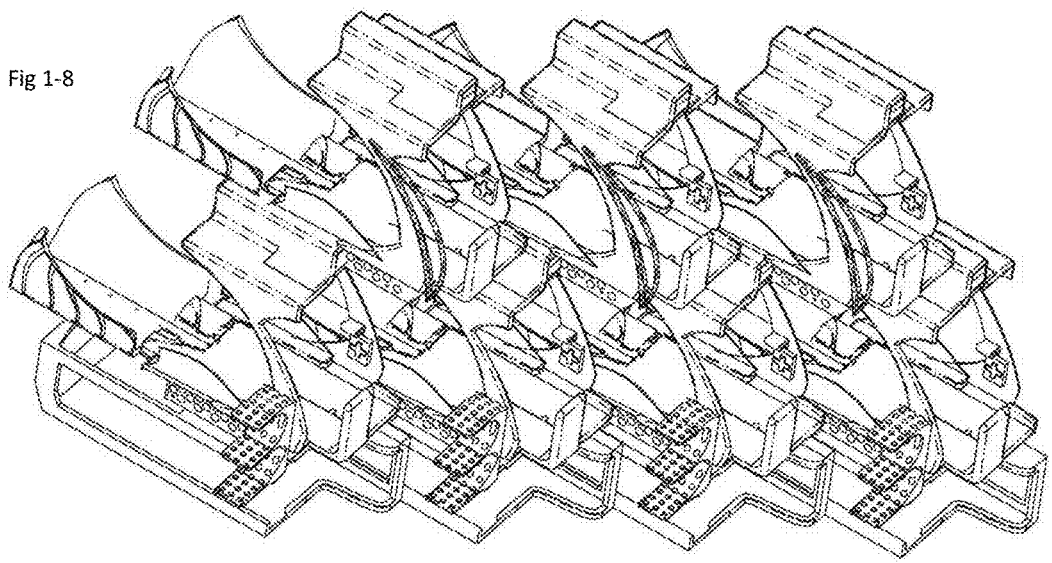

FIG. 6-8, shows an embodiment of a lower or upper bin in an air sleeper assembly. In such an assembly as provided in for example PCT/US2009/00342 the bins may have drawers. Such drawers may need to open into the aisles that have limited space. Considering that the bins may be over 72" long access to the further end of the bin will be difficult with the opening into an aisle that may be 20" wide. The figure shows an invention that solves this problem. There is a belt that is fixed to the bottom of the drawer and when the drawer is opened even by less than 20" it gives access to all objects that are placed on the front of the belt, the objects may be removed and the belt moved (manually or by actuator) such the next section of the belt becomes accessible and so on until all the objects may be removed. Similarly while loading the belt, objects are placed on the belt and the belt moved to reveal the next section of belt which is then filled and so on till the first set of objects on the belt reach the other end of the belt and the drawer is filled. The drawer may then be closed. An alternative embodiment would not use a drawer at all but simply a belt with a door at the end of the bin so that as the objects are removed from the belt the belt may be moved to reveal the objects further inside the bin on the belt and so on till all the object at the back of the bin are removed. The process reversed will allow filling the bin as well. In this case too manual or actuator movement of the belt is possible and such arrangements are well disclosed in the background art.

Typically the lower bin would be more convenient to load and unload with a drawer while the upper bin may not need the drawer but simply a door and the belt inside. In all cased of course the belt will need a support surface that is attached to the drawer in the first case or the bin in the second case and will be constructed to have rollers or a good sliding surface (possibly coated with Teflon or similar sliding material). The fig does not show the rollers at the ends of the belt to keep its tension and position. Such rollers on such belts are well disclosed in the background art.

FIG. 6-9 show the arrangement in FIG. 6-9 in an exploded view.

FIG. 6-10, shows the buckle for tensioning the seatbelt in a car for the attachment of a CRS. The buckle has a loop of the pair of webbing sections inserted through a slot and a pin is inserted into that loop. The Pin is enabled to slide in a second slot but is locked to prevent it from retraction when the CRS is in use. Such locking devices for pins are well disclosed in the background art. The Buckle (called the Belt-box) has a section that can slide over the side member of the CRS base side member (FIG. 11). When the belt is in tension as a result of the CRS inertial loading for example under front impact, the body of the Belt box will move forward and the pin will be held back by the webbing sections. As a result the pin will slide to the extent possible backwards in the second slot and the webbing will be pressed against the rough section of the Belt Box and therefore prevent slippage of the belt, the rough sections may be serrated or with points and edges to hold the webbing but not cut or damage it and thereby prevent its role in supporting a tensile loading.

FIG. 6-11, Shows the Belt Box or buckle as in FIG. 6-10 attached to the CRS. Notably the Belt box may be rigidly attached to the side members of the CRS or slidably attached to these side members with an attachment to a cable or other tension supporting member that lies inside or adjoining the side member and is attached at its other end to a tensioning mechanism. In the event the cable or other tension members are inside the side member of the CRS base, there will be a slot in the side member to provide the necessary access to the belt box. Alternatively the belt box may have a pin that passes through a slot on the surface of the side member that engages the cable or other tension member.

The fig show the routing of the belt around the pin in the belt box and then behind the CRS (in other embodiments it may be a slot specially designed for this routing) an to a similar belt box on the other side. A clamp may be employed between the shoulder section and the lap section of the webbing to keep them together.

Figures 1, 2, 3, 4, 5, 6, 7, 8, 9:
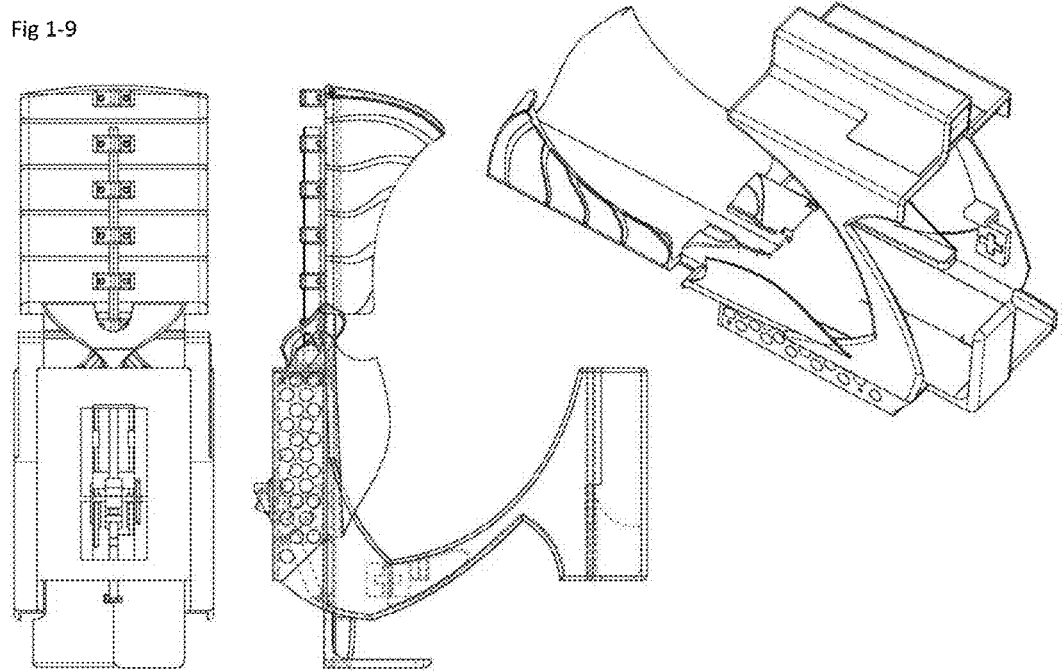
Figures 1, 2, 3, 4, 5, 6, 7, 8, 9, 10, 11, 12, 13, 14, 15, 16:
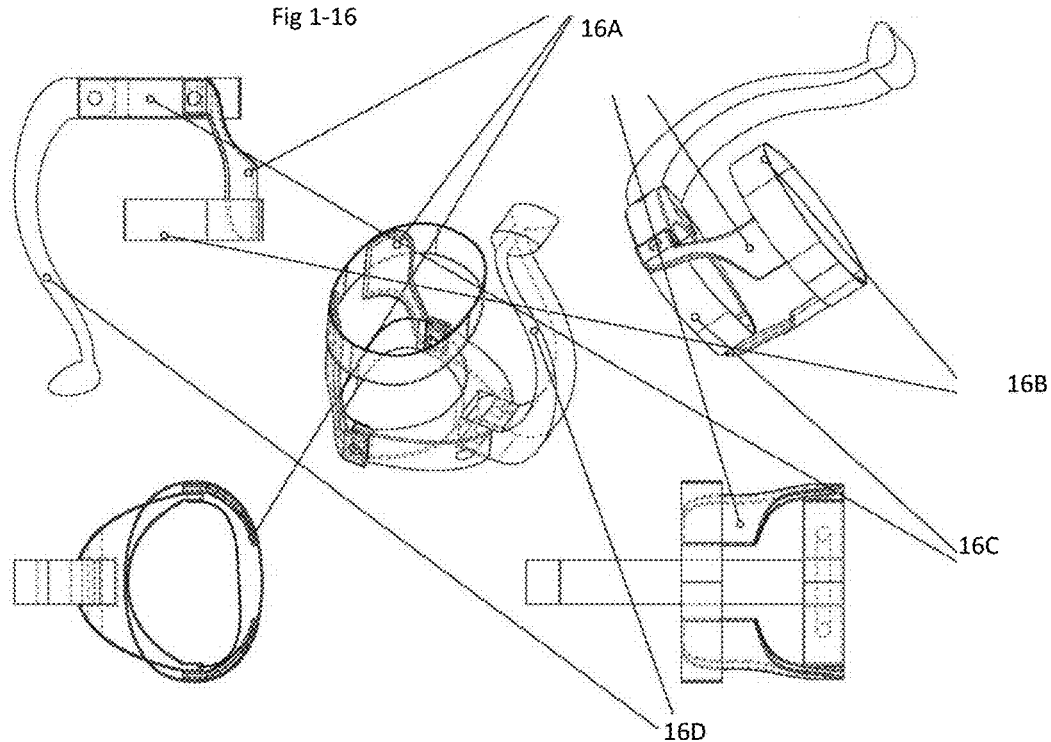
Figures 1, 2:
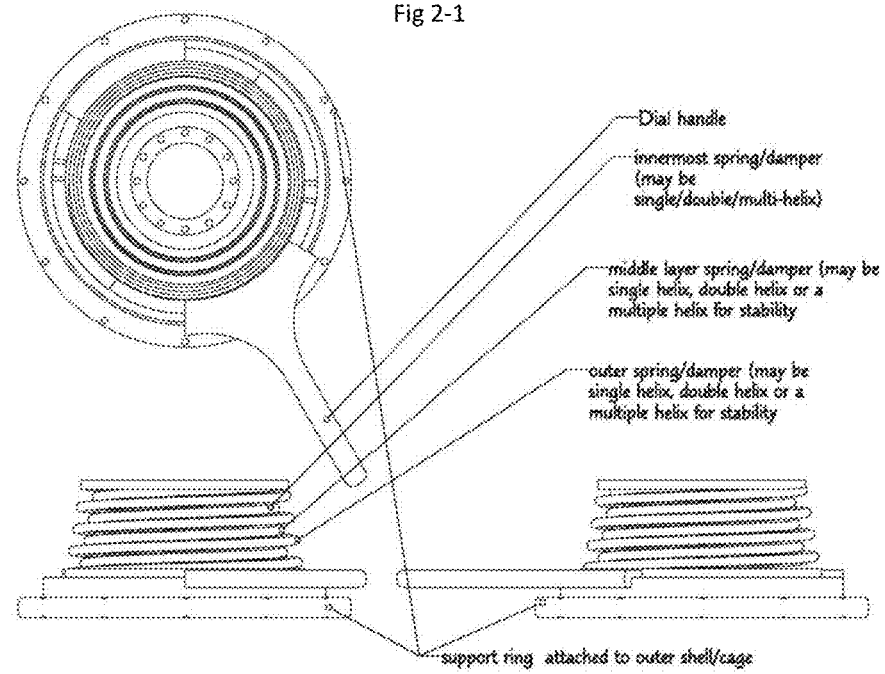
Figure 2:
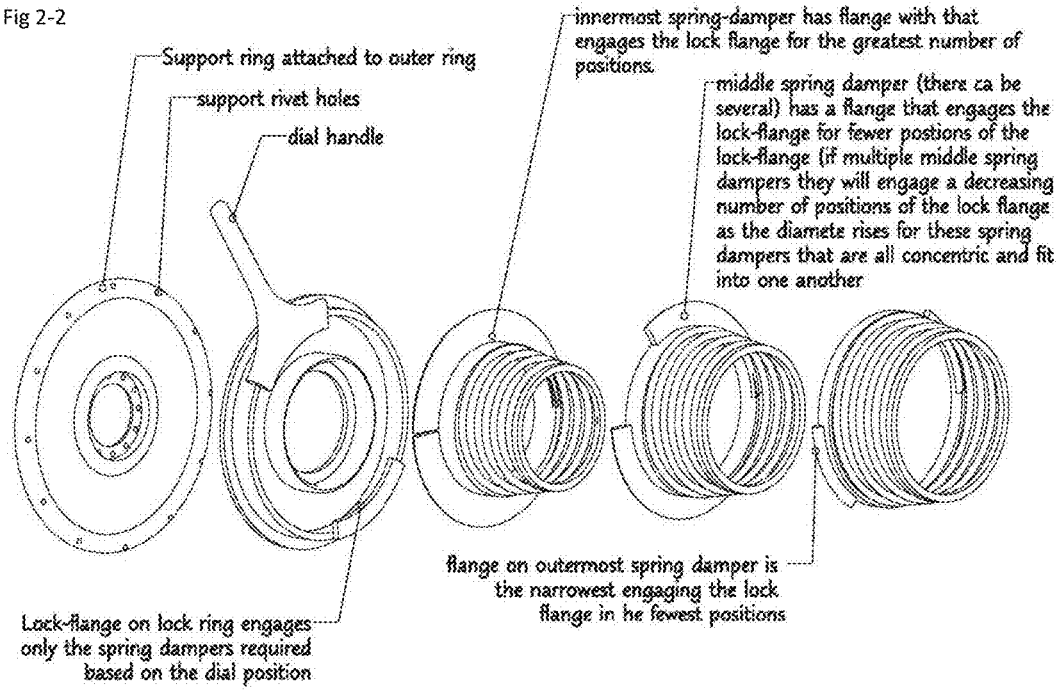
Figures 2, 3:
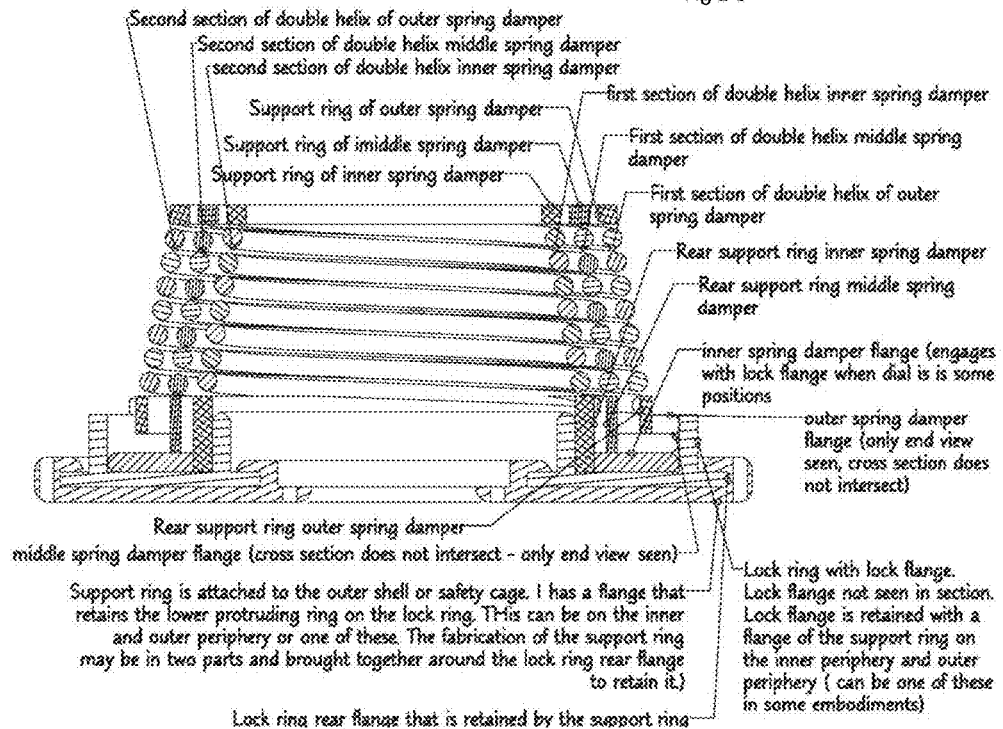
Figures 2, 3, 4, 5, 6, 7, 8, 9, 10:
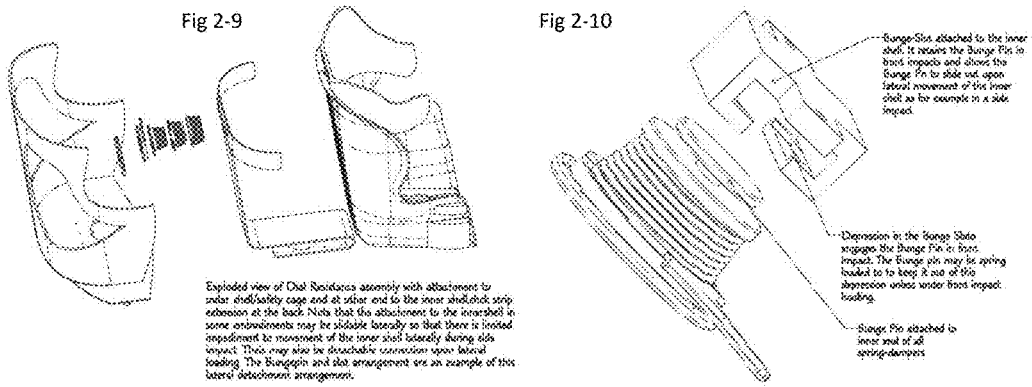
Figures 2, 3, 4, 5, 6, 7, 8, 9, 10, 11, 12, 13, 14:
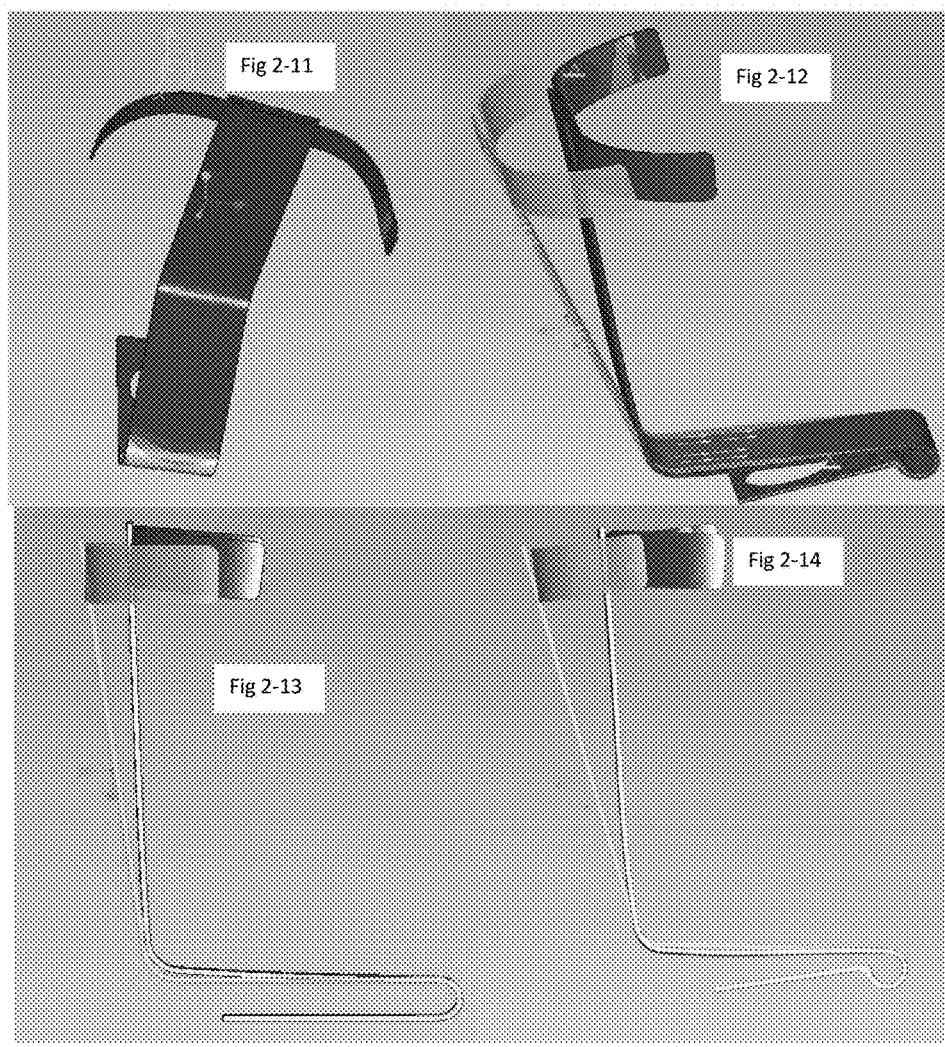
Figures 1, 3:
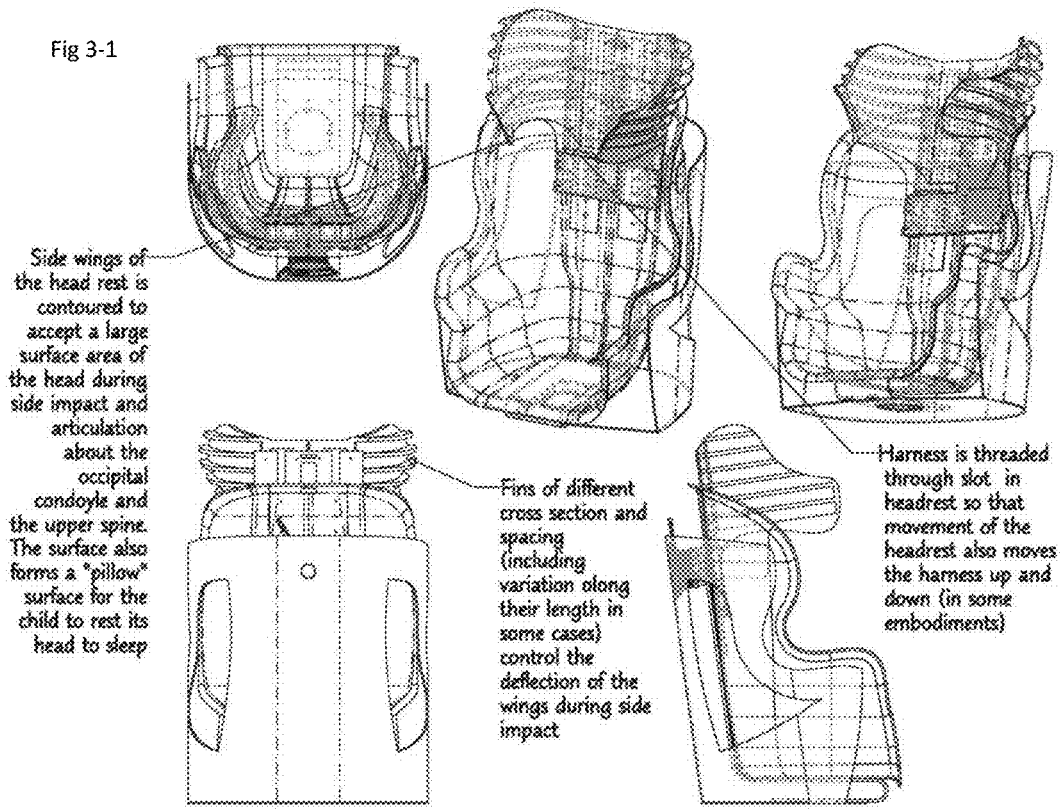
Figures 2, 3:
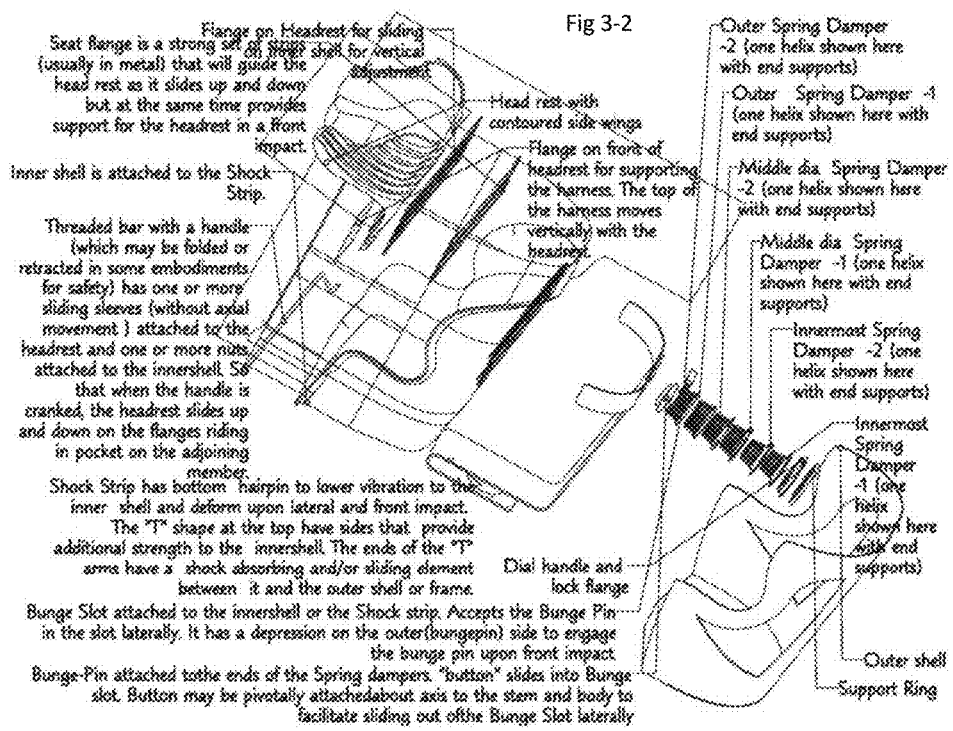
Figure 3:
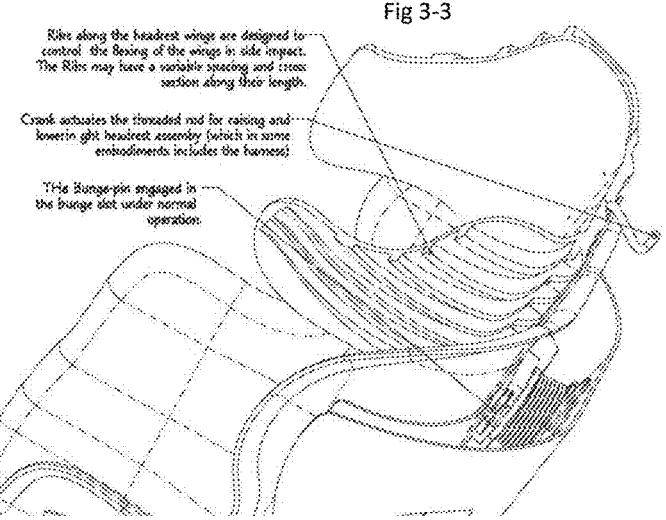
Figures 3, 4:
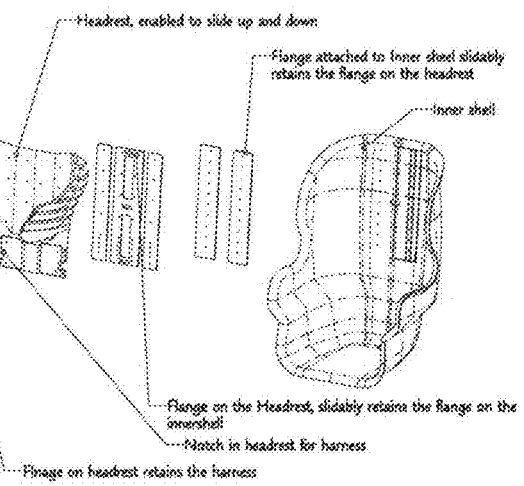
Figures 3, 4, 5:
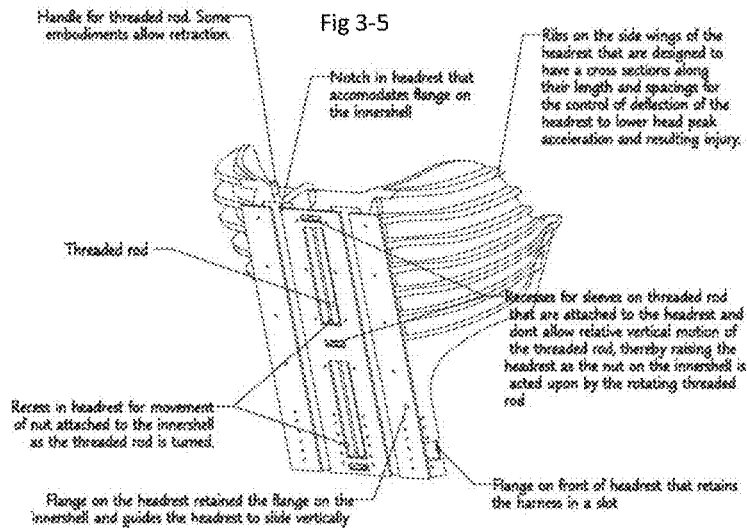
Figures 2, 4:
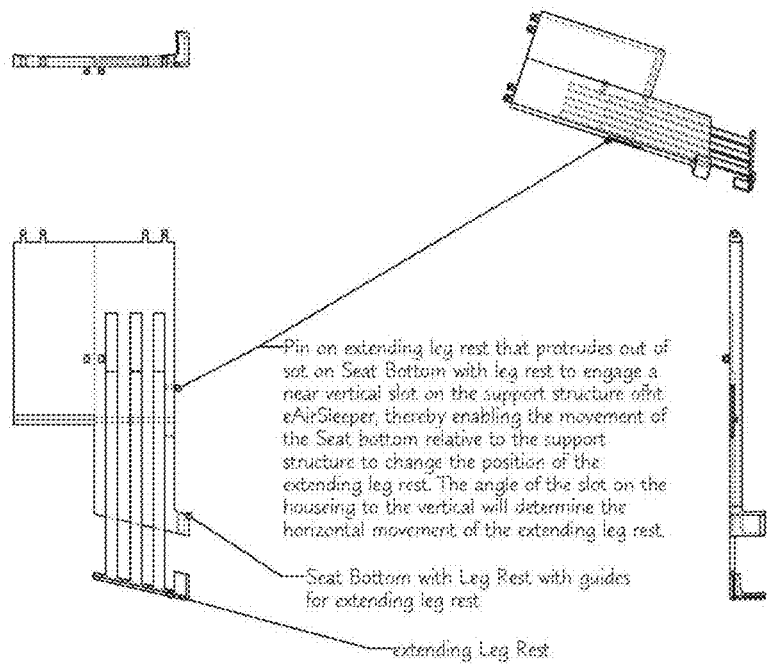
Figures 1, 5:
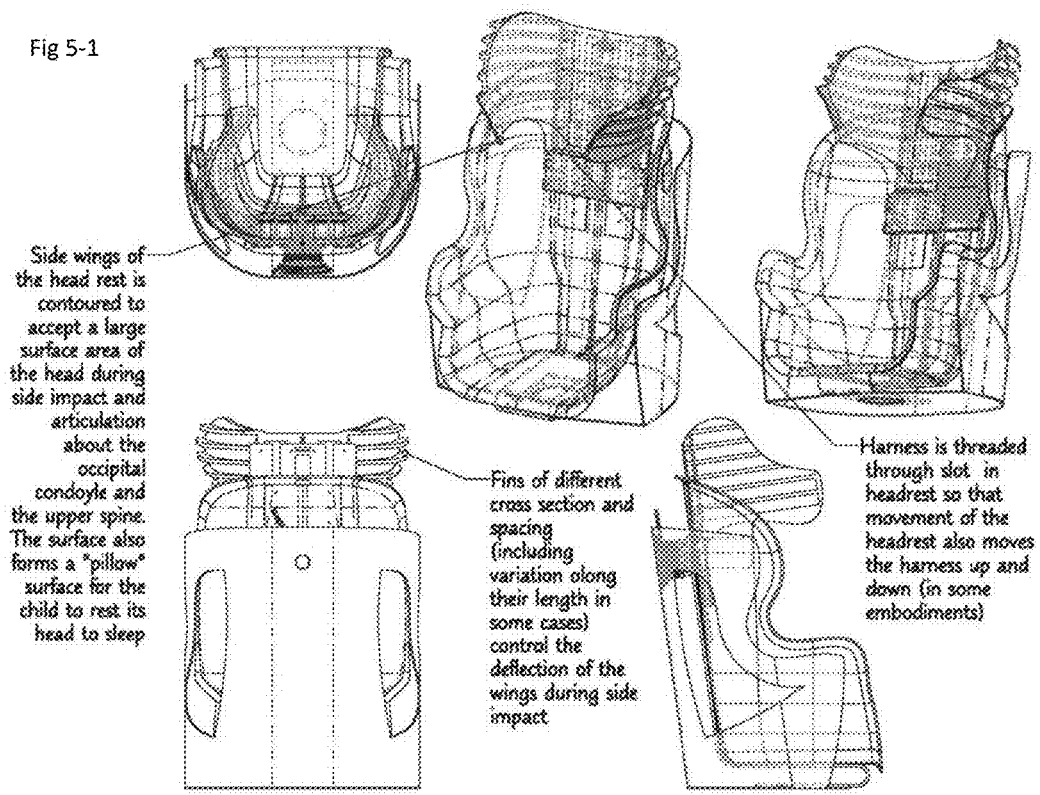
Figures 1, 6:
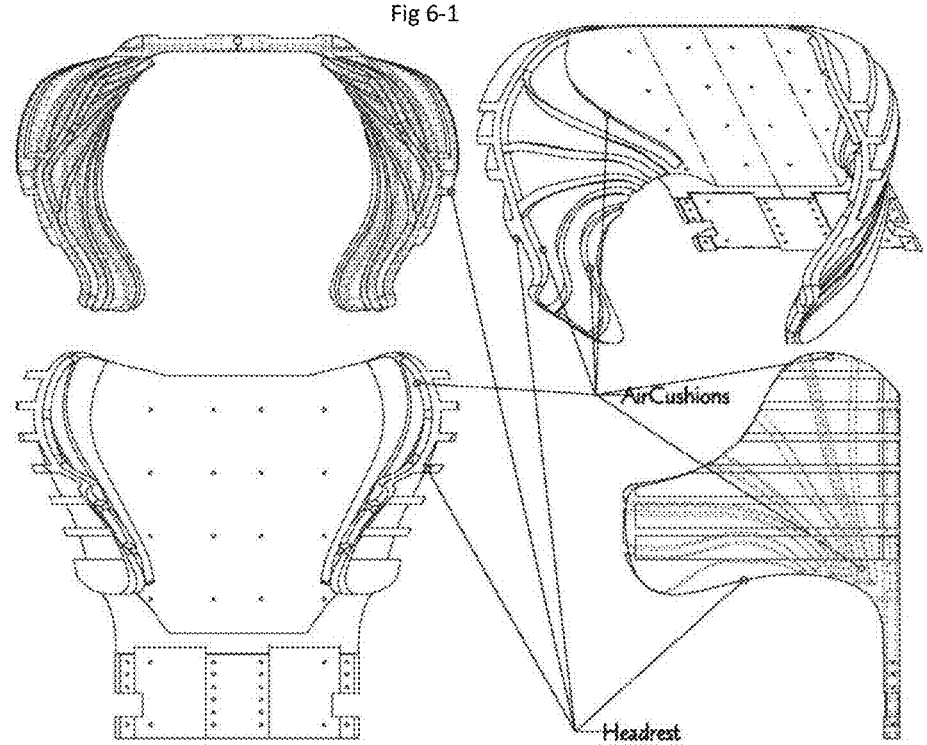
Figures 2, 6:
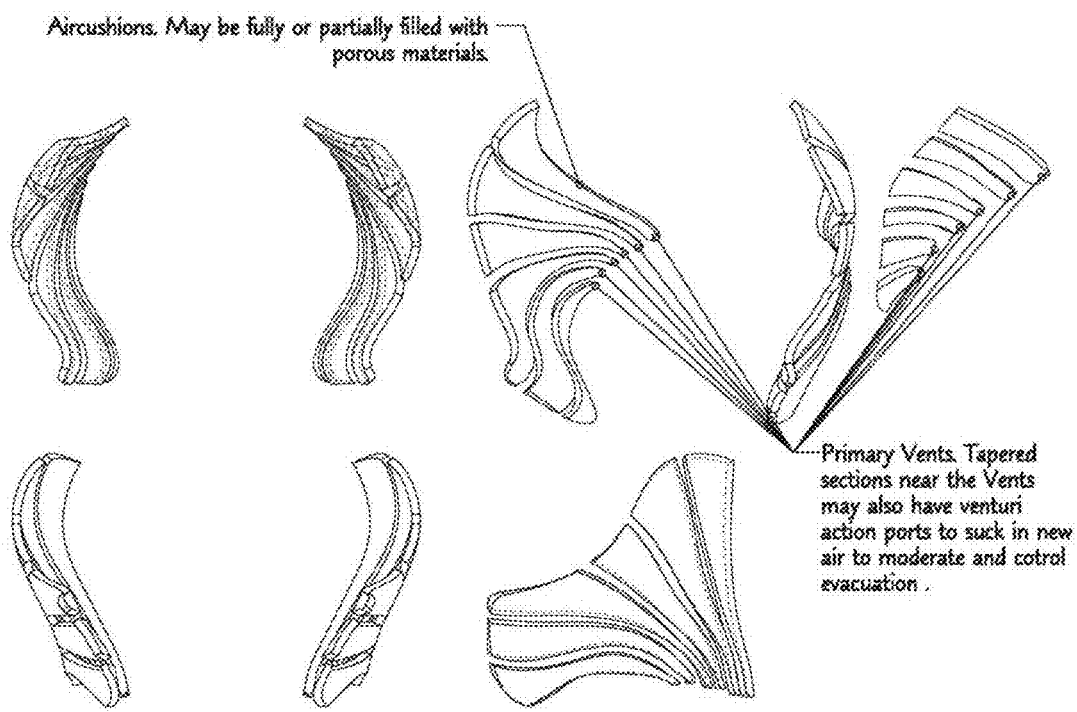
Figures 3, 6:
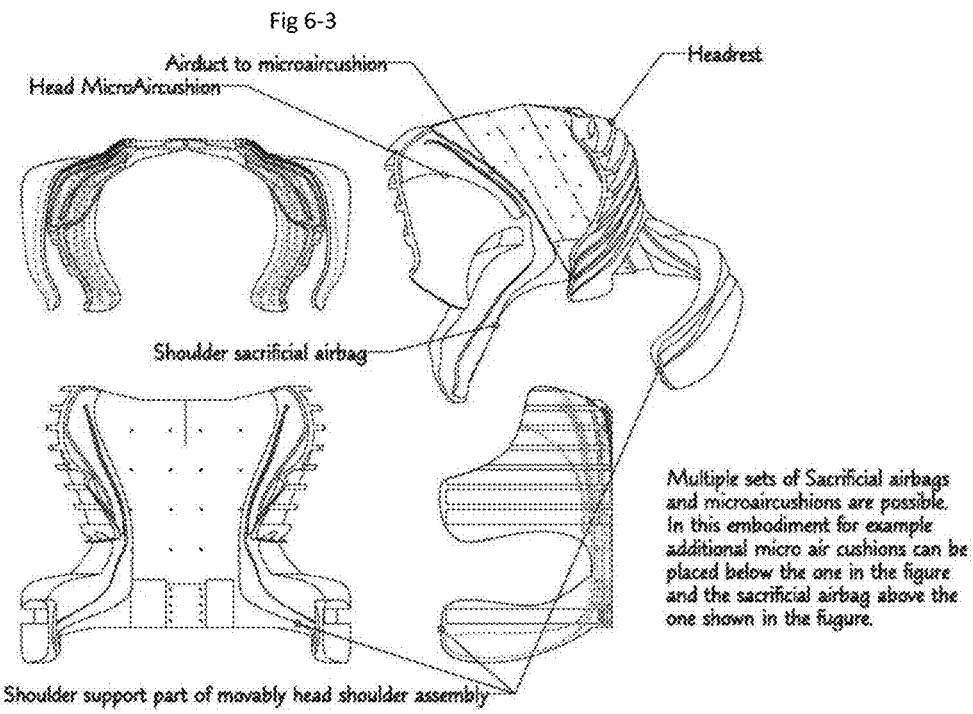
Figures 4, 6:
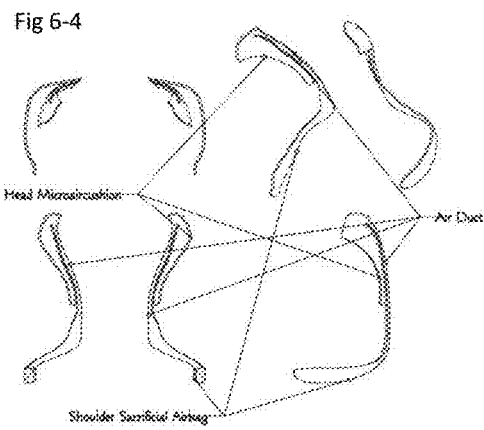
Figure 6:
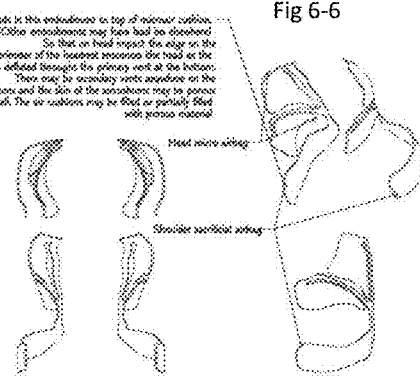
Figures 5, 6:
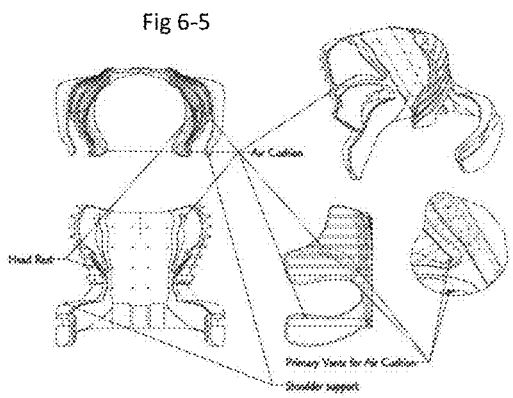
Figures 6, 7:
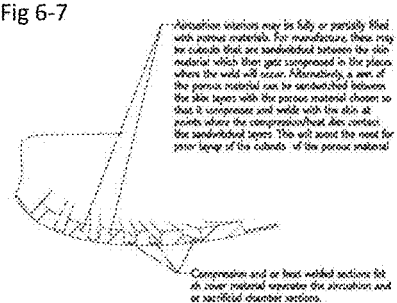
Figures 6, 7, 8, 9, 10:
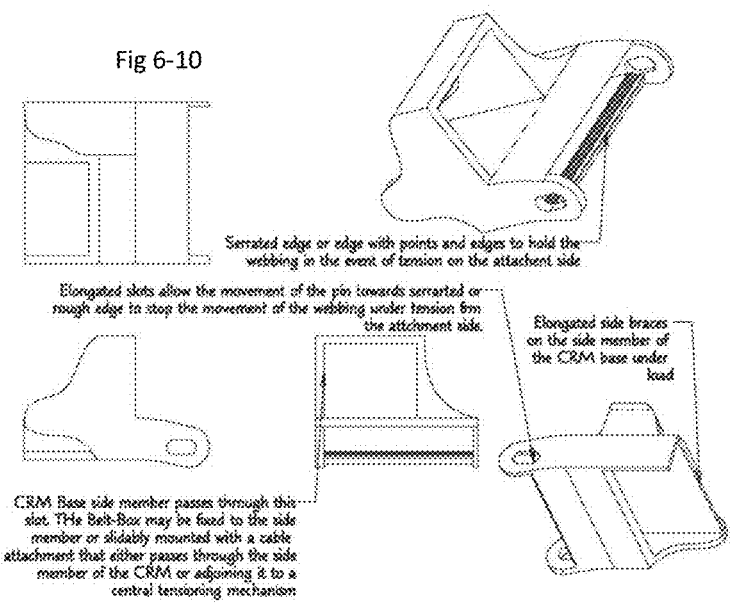
Figures 6, 7, 8, 9, 10, 11:
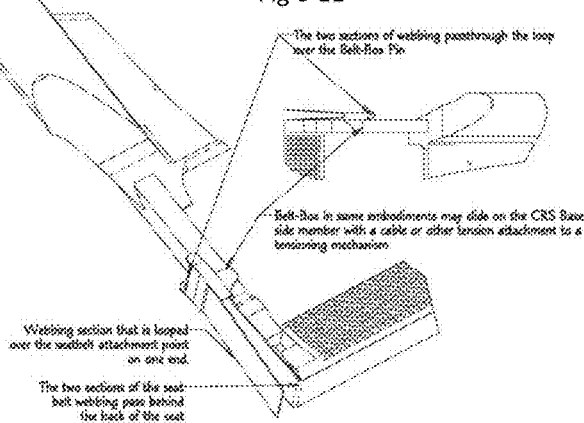
Figures 6, 7, 8, 9, 10, 11, 12:
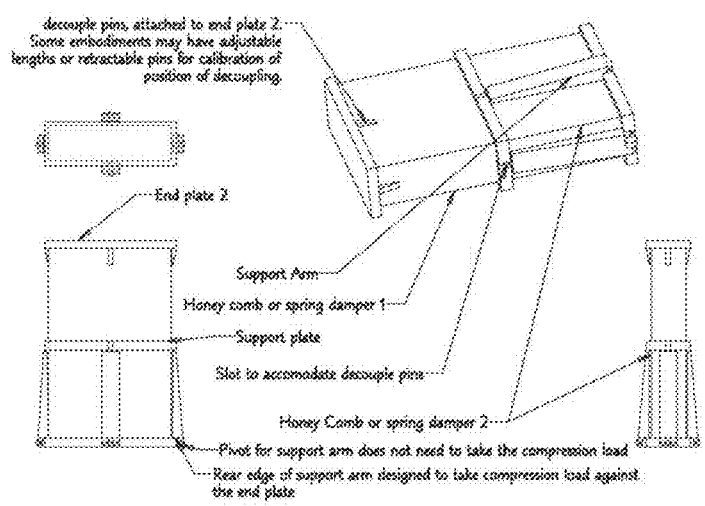
Figures 6, 7, 8, 9, 10, 11, 12, 13:
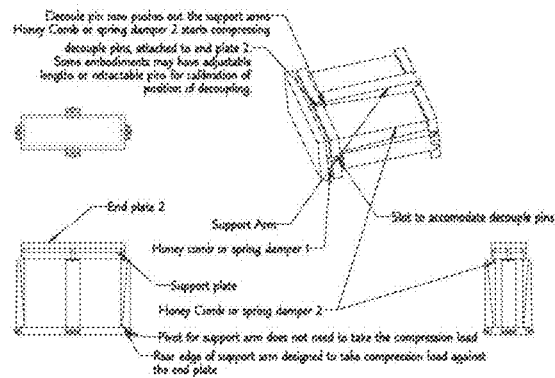
Figures 6, 7, 8, 9, 10, 11, 12, 13, 14:
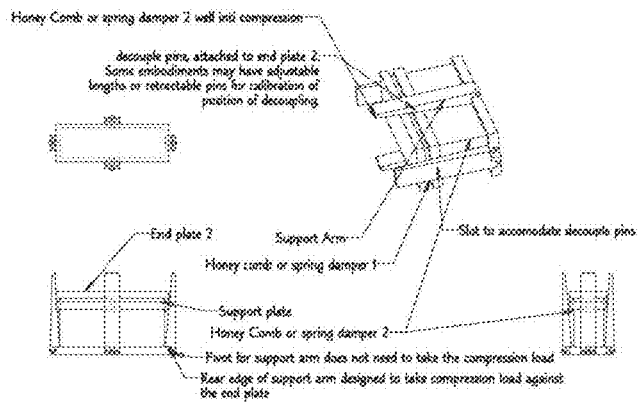
Figures 1, 7:
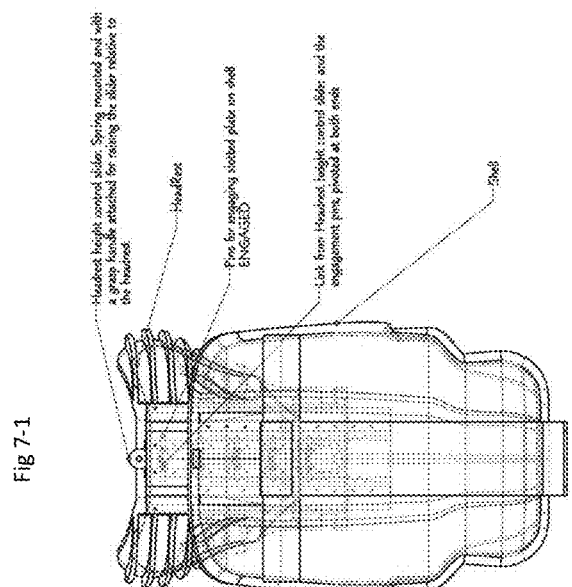
Figures 2, 7:
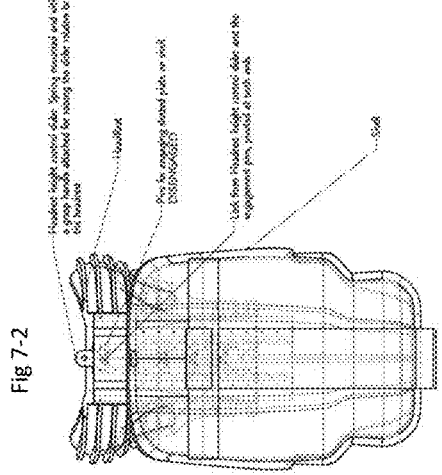
Figures 3, 7:
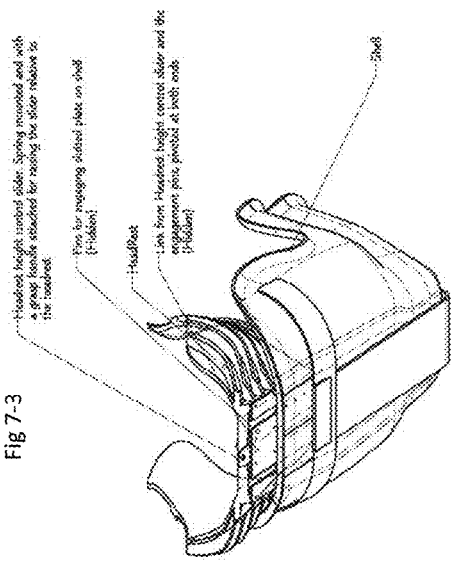
Figures 4, 7:
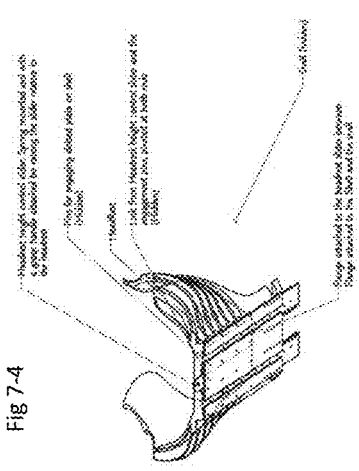
Figures 5, 7:
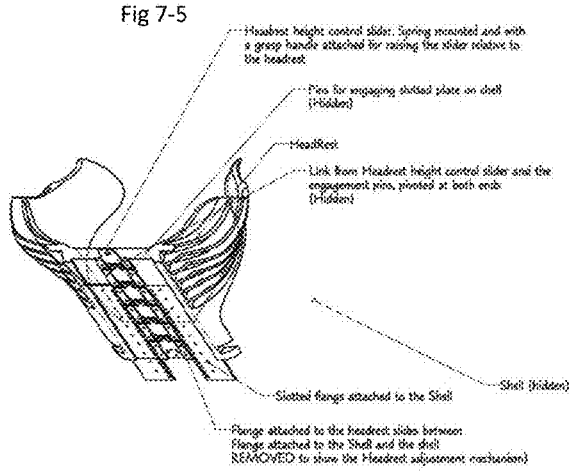
Figures 6, 7:
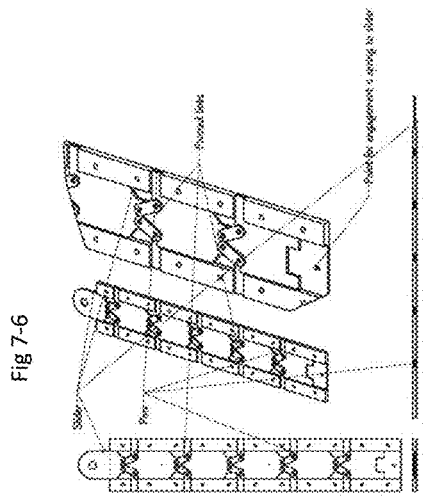
Figure 7:
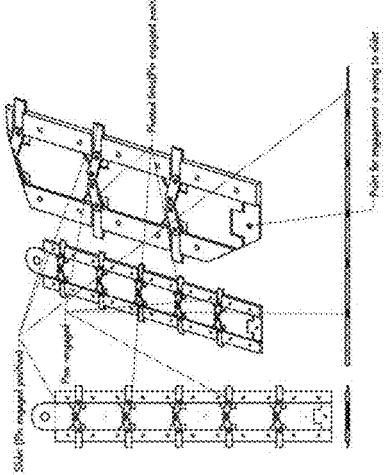
Figures 7, 8:
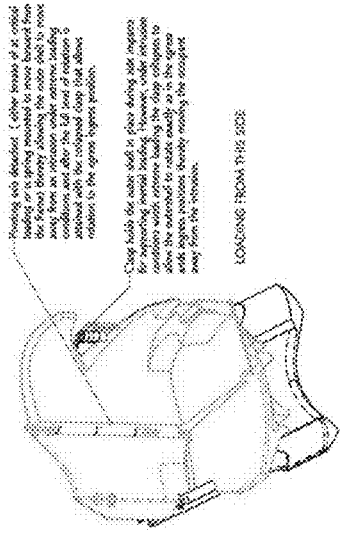
Figures 7, 8, 9:
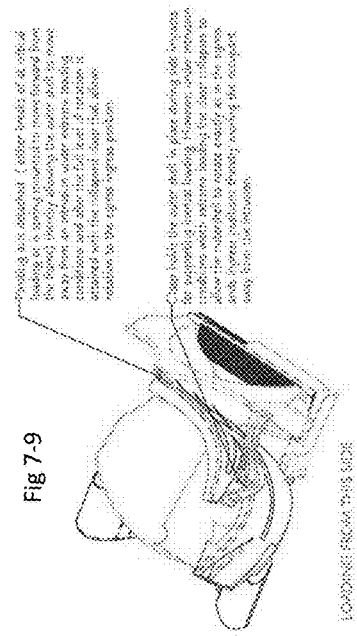
Figures 7, 8, 9, 10:
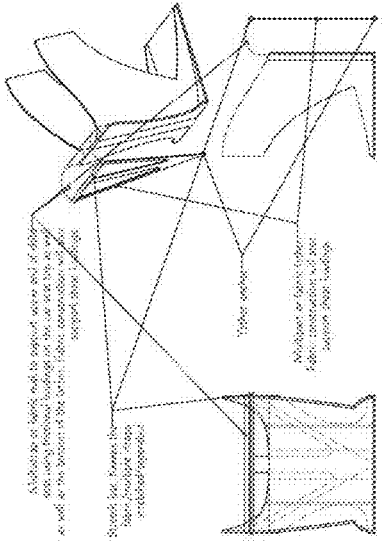
Figures 7, 8, 9, 10, 11:
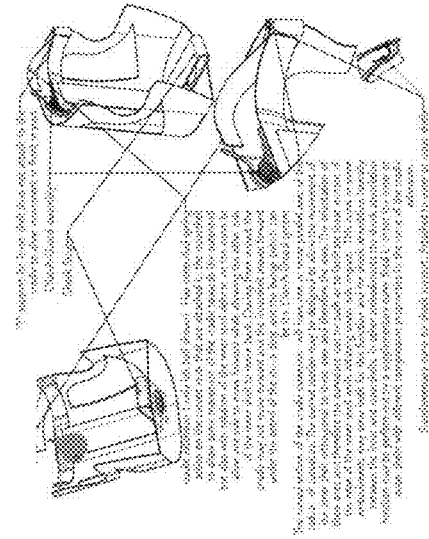
Figures 7, 8, 9, 10, 11, 12:
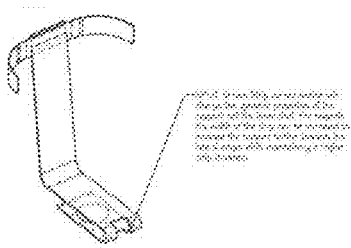

FIG. 6-12, shows an apparatus to provide spring damper combinations with different compression properties. The embodiment shown has two sections but the mechanism is easily replicated between pairs of dividing plates to have multiple sections of spring dampers or honeycomb. FIG. 12 shows pins that are enabled to push out the support arms when End plate 2 has crushed the honey comb (in this case honey comb and not spring damper is used) Until the support arms are pushed out the honey comb 1 is compressed. This Honey comb may be stiffer than the honey comb 2 and therefore the apparatus is required for this case. The support arms may slide out from the edge of the support plate or they may have rollers on bearings that ease the movement over the edge while under compressive loading. If rollers are used a small ridge may be needed to prevent the rollers from rolling out before the pins release them. The pivot of the Support arm is arranged to be away from the compression path. Some friction on the pivot however can control the movement of the support arms ahead of the engagement of the pins. There is a support surface of the support arms that engage the end plate 1.

FIG. 6-13, shows the same arrangement as FIG. 6-12 where the first honey comb has been compressed and the pins have just released the support arms, the second honey comb has started compressing.

FIG. 6-14 shows the compression of the second honey comb well progressed.

FIGS. 7-1 to 7-7, show a mechanism for the attachment of a headrest (that may include the support for the harness and may include shoulder lateral supports) to the shell supporting the occupant in a CRS. This mechanism has many embodiments, the one illustrated in the figures has one or more pins that are enabled to insert into slots at different height positions of the headrest thereby providing a locking mechanism for the headrest at these heights to accommodate children of different heights.

FIG. 7-1, shows the headrest and the shell with the mechanism with the pins engaged to the slots on the support shell thereby locking the headrest to the shell.

FIG. 7-2, shows the same view as FIG. 7-1 with the Pins disengaged from the slots on the shell to allow the sliding motion of the headrest to the preferred position before releasing the catch that reengages the pins to the slots.

Both these figures show the Height control slider that retracts and re-engages the pins through the attachment by pivoted links (other embodiments may have other linking mechanisms to attach a height control device to the pins,) the height control slider is attached to a trigger or a lever that can be raised relative to a handle attached to the headrest, to elevate the slider relative to the headrest and thereby release the pins from the slots. The slider may be attached to a spring to maintain the engaged position as the normal position.

FIG. 7-3, Shows either of the FIG. 7-1, or 7-2, in another view it also illustrates the interleaved flanges that are attached to the Shell and to the headrest that slide relative to each other and support the headrest relative to the shell.

FIG. 7-4, shows the parts of FIG. 7-3, with the shell removed. It shows the flange that is attached to the headrest that is behind the slotted flange that is attached to the shell, thereby supporting the headrest and allowing the flanges to slide relative to each other. Adjoining the slotted flange attached to the shell on its inner edge is the mechanism with pins that engage the slots on the flange.

FIG. 7-5, how the Assembly of FIG. 7-4, with the flange attached to the headrest removed to reveal parts of the mechanism for retracting the pins that is attached to the headrest. Notably the flange that is attached to the headrest (removed in FIG. 7-5 relative to FIG. 7-4) is attached directly to the static parts of the mechanism and to the headrest itself.

FIG. 7-6, and FIG. 7-7, show the mechanism for the retraction of the pins. This mechanism is attached to the headrest and a trigger or lever is attached to the top of the slider that may be operated in conjunction with a handle attached to the headrest, such that when the trigger is depressed the slider slides upwards against a spring loading and thereby pulls the pivoted links upwards which in turn pull the pins into the body of the mechanism.

FIG. 7-6 shows the pins in the retracted position with the trigger pulled and the slider elevated against the spring loading, while FIG. 7-7 shows the same assembly in the normal position with the pins engaged or out of the body of the housing. The Housing of the mechanism is securely fasted to the headrest.

Notably a similar and alternative mechanism can be mounted on the shell with the slots arranged on a flange on the headrest.

FIGS. 7-8, and FIG. 7-9, illustrate a mechanism for the accommodation of extreme intrusion into the space of the CRS during side impact. The CRS in this Fig shows an outer shell (which contains the inner shell supporting the child. The invention will also be applicable to a single shell instead of the outer shell shown here) that is pivoted along its back ad has limited rotational motion about this axis that is normally enabled for egress and ingress. It is locked in position for normal operation of the vehicle to protect the child in a side impact. However this invention enables the clasp that holds the outer shell to collapse under a predefined extreme loading of the intrusion to allow the outer shell to rotate about the central axis thereby moving the child away from and reorienting the child away from the intrusion and the impact (FIG. 9). In extreme cases where the intrusion is severe this movement is not sufficient, the invention has a pivot that detaches or moves so that the outer shell can be pushed further by the intruding objects.

These two inventions allow the secure mounting of the child seat to the vehicle for optimal performance under less severe impact conditions and also minimizes the size of the intruding child seat into the space of the adjoining passenger thereby reducing potential injury to that passenger.

FIG. 7-10, illustrates a CRS invention that provides enhanced support for the CRS relative to the car seat. It has either a plurality of straps or a fabric/continuous material that is/are anchored to a bar that is on the back of the seat which in turn is attached to the anchor point of the vehicle for the tether. The stretch bar keeps the fabric or the set of straps separated and thereby gives a significant frictional bonding between the fabric or the set of straps and the seat back to support the top of the seat in side impacts.

FIG. 7-11, is another aspect of a CRS invention that has a inner shell supporting the occupant and an outer shell that is attached to the inner shell through shock absorbing elements. Previous disclosures of this invention have used a shock strip supporting the bottom of the inner shell and "fingers" supporting the upper sides of the inner shell and a Bunge sling or a Dial-A-Guard element providing support for forward impact movement of the inner shell, the present embodiments may have all these aspects of the support but rather than the "fingers" they are supported by a side shock strip that may be made of metal that may extend around the back of the inner shell and cradle the inner shell. Other embodiments may simply have a short section of the strip hugging the inner shell and attached to it. There may be in addition as shown an optional supplementary shock strip "curve" that can absorb lateral impacts.

FIG. 7-12, shows a "split" shock strip at the bottom support of the inner shell. This will change the deformation characteristics of the shock strip. Such a split shock strip may also be used on the lateral or side shock strips as in FIG. 7-11.

DETAILED DESCRIPTION OF INVENTION

Air Sleeper

Several variations of Air Sleeper embodiments are presented in this invention. They present a structure with multi-tiers of occupants, wherein each of the occupants have an occupant space, and this space has a ceiling that can in some embodiments have a front edge that is substantially orthogonal to the direction of the occupant facing direction. Each of the upper tier occupant spaces has a foot space while the occupant is in a sitting position that may be partially below the ceiling of the lower tier occupant spaces. One of the challenges is to accommodate this lower level foot rest without encumbering the lower level occupants and their spaces, the variations proposed, show a side mounted foot rest rather than a centrally mounted footrest as in prior disclosures, that may be of particular value in angled embodiments of the Air Sleeper in the cabin. As may be seen from FIGS. 1-1 to 1-10, the location of the leg rest on one side allows additional possibilities for the location of the steps and benefits from the natural shielding of the legs of the upper tier occupants from the lower tier on one side with the support structure of the lower Air Sleeper. On the open side in this angular deployment the leg rest is far forward of the lower tier occupant (on that side) and may not even require a foot screen. Egress and ingress to/from this lower AirSleeper can be achieved entirely behind the leg rest of the upper tier in many embodiments.

It may however be preferable in some embodiments to have a screen in front of the AirSleepers at both levels. In the angled deployment shown such screens can be attached immediately in front of the AirSleepers as egress and ingress are achieved at an angle from the aisle. The other benefit in the side mounted leg rests is that the space of the leg rest does not affect the lower tier AirSleeper, (in the center mounted case half of the leg rest is immediately above the "forward" lower tier AirSleeper and so needs to be accommodated with a cutout or reduction in the top corner of the lower tier AirSleeper.

FIG. 3-9 shows the AirSleeper with a rear pivot that supports the backrest, the bottom rest and the frame with an elevated pivot. Such actuation of this rear pivot can angle the seat bottom much more than without and can even raise the back enough to have the seat back and bottom at the same angle. This can enable a passenger to lie face down and raise the head end to a level of a window if necessary and if available at a higher level. FIG. 3-10 shows the embodiment with the rear pivot in the normal position. This actuation can be achieved with the rear pivot mounted on an arm that is itself pivoted about the same axis as the lower pivot of the shadow arm. An actuator can enable such movement.

Clearly there will need to be support arrangements to give the rear end of the seat bottom adequate lateral support.

As shown in FIGS. 4-1 and 4-2, the extending leg support is designed to increase the length of the Air Sleeper beyond the end of the Seat bottom/leg rest. In some embodiments of the Air Sleeper the movement of the AirSleeper from the sitting to the flat bed position results in the rise of the seat bottom. In such embodiments this may be accompanies by a movement of the seat bottom backwards horizontally as the rise may be related to a pivotal movement about a lateral axis relative to the Air Sleeper. In such embodiments with the horizontal movement of the Air Sleeper seat bottom in the axial direction as the seat moves from the sit-up position to the bed position, the absolute position of the end of the leg rest relative to the aircraft aisle will change. Therefore, in some such embodiments the leg rest will be at its maximum position with regard to the aisle when in the sit up position but move back as the seat is reclined and eventually brought to the flat bed position. This will result in the full available length to the aisle not being used by the bed (or in the reclined position). To counter this the extending leg rest may be used. Here the extending leg rest has a pin that engages the fixed support structure of the AirSleeper and as the seat bottom rises to the flat bed position, the pin follows a slot in the fixed structure and stays in the horizontal position of the slot at the corresponding vertical position of the seat bottom (and in turn the pin). Therefore, if the pin is maintained in the slot and the slot on the seat support structure is vertical, extending leg rest will have a constant horizontal position relative to the aisle and the fixed structures, thereby utilizing the maximum length of the AirSleeper in all positions including the horizontal flat bed position. Notably the pin that actuates the position of the extending leg rest, may be at a higher level than the seat bottom & Leg rest to avoid the machinery for lowering and raising the seat. In this situation the pin can be for example be attached to a section of the extending leg rest that is at the edge of the seat bottom/leg rest. and has a vertical protrusion that is attached to the pin.

In another related application, where the aisle width is required by regulations or otherwise to be a width "A" below a height "H" and allowed to be a different width "B" above the height "H", there is an opportunity to utilize some of the aisle space for the bed position that is higher than the sitting position if "B" is greater than "A". Conversely, if there is more aisle space required at the sitting position "A" than the bed position "B" above "H", in these embodiments of the AirSleeper, this may be engineering in these embodiments by utilizing an angled slot on the fixed structure of the AirSleeper supports to guide the pin, and angle the slot (curved slots are also possible) so that as the seat bottom rises the slot guides the pin forwards relative to the fixed support structure so that in the bed position the extending let support is at a forward displacement that allows the aisle width "B" and creates a longer bed as a result. In another application the extending leg rest may not use the pin at all and be manually extended to the length desired by the occupant and in still other cases enabled with an actuator.

Finally other embodiments of the Airsleeper previously disclosed have a bed that moves forward (in the facing direction) and or down from the sitting position. The same principle can be used for these embodiments of the Airsleeper to maximize the length of the bed relative to available aisle space at different heights.

The aspect of the invention with embodiments as in FIG. 6-8, 6-9 relates to the bins in the AirSleeper configurations where the bins may be up to 80" long and need to be accessed from the aisle of the aircraft that may be about 20" wide. For the lower bins a drawer may be used to access the front of the bin. However the rear of the bin may not be easily accessible from the drawer. Similarly for the upper bin a door may be used in the front but may not provide easy access to the back of that bin. The invention provides a belt within the drawer or within the bin to move materials from the back of the bin to the front of the bin and vice versa. The movement of the belt may be by actuator or manual.

The belt runs between two axles at the front and the back of the drawer or bin. IT has a surface to provide support for the weight of the materials that will be placed on the belt. Such a surface needs to be engineered to have a low level of friction under load. Alternatively the belt may be supported by intervening rollers. Finally the belt may even be in sections i.e. narrow sections of belt between pulleys at the back and the front. The embodiments shown are centered on the lower air sleeper. However, this is not necessary and often not desirable. If the Bins are offset to be centered between the lower tier of Air Sleepers, there is easier access to the bins when the lower tier is occupied and the foot rests are lowered. Moreover, in some Air Sleepers the arm rest area is higher than the center of the Airsleeper module thereby providing a higher section for storage below the arm rest area. This continuous space between adjoining arm rests can be best utilized of the bin is centered between the lower tier Air Sleepers. Notably the Frame (disclosed in documents included herein by reference) may need to be shaped to hug the shape of the arm rests to increase the storage space. The cross section of the frame being maintained to support the necessary loadings.

Child Seat

The inventions as disclosed in the documents incorporated herein by reference has many different embodiments as previously disclosed. The invention includes a method for customizing each of these embodiments to specific classes of autos that have different crash characteristics. The difficulty in design is that there needs to be an observable factor related to the cars that can be used by consumers to then choose the right child seat. The Method of the present invention as in FIGS. 2-1 to 2-10 uses a range of crash pulses that are measured at the rear seat where the child seat will be located for standard crash tests conducted for cars and for which cars are provided with ratings (star ratings), to calibrate the performance of the child seat to provide the best injury performance related to acceleration of the head and other observable injury factors. It involves the steps of classifying cars in the market into groups with different observable ratings (in the extreme this can be the entire set of available cars but in practice it could be cars grouped into their Star ratings). Using the crash data from these car crash tests to identify the range of acceleration pulses that are experienced by one or more accelerometers at the location for the back seat of these cars; Using these accelerometer pulses as the input for simulations and test of the child seats for their design; identifying controllable parts that can be customized for each of the classes of vehicles. Offering the child seals with the required customize parts (either preinstalled or customer installable) to the customer.

With this in mind one class of embodiments are disclosed in this invention called the dial-resistance bunge sling. It is tunable with a tuning device. It is made up of concentric spring dampers. The type of Bunge sling may have a variable resistance "dialed in" with the dial handle by engaging different numbers of Spring Dampers as required that may be dependent on parameters related to the physical size of the child and/or the properties of the pulse at the mounting location of the child seat in a front impact. The latter may vary depending on the crumple zone and other factors of the car.

The Fig shows three concentric spring dampers. However there is no limit on the number except for the space for installation. With more spring dampers there are more options to tune the arrangement for a different load characteristics. Each of the spring dampers may have a single helix as in a coil spring but may also be a double helix or even a multi-helix for greater stability of the end rings and the connection points to the stretching spring damper coils. The taper of the spring dampers will lower the possibility of slight lateral movements affecting the stretching of inner coils relative to non-stretching (and unselected) outer coils, the dial handle is attached to a lock ring that slides on the support ring (engaged with rear flanges to the retaining ring in this embodiment) and thereby with its lock flange engages one or more of the spring damper flanges which are designed to have an arc length that includes a section under the lock flange at the dial positions where retention and engagement of the that spring damper is desired. Some of the flanges of the spring dampers are therefore longer arcs than others and they are designed to allow some spring dampers to move freely when the others are engaged by the lock flanges. Notably in all these cases the outer shell/safety cage must be attached to the support structure of the seat to support front impact loadings, unless of course the Bunge attachments are directly attached at the back to the seat support structure attached to the car.

Another embodiment of such a tunable resistance device as in the dial-resistance device noted above, is a shock absorber element that is attached at one end to the fixed structure of the CRS or the vehicle at a point at the center and back of the inner shell. The second end of this device is attached to a cable that goes over a slide or pulley at the back higher up along the inner shell and is attached to the inner shell, the attachment point to the inner shell could be about the location where the dial-resistance device is attached in other embodiments. The pulley or slide would be directly behind it. In the event of an impact the cable will pull the end of the shock absorber which will elongate upwards (it can elongate till it reaches the pulley). Such a device can have the shock absorber with variable springs or an air damper with variable vents and gas dynamics control.

Another aspect of the invention is a new embodiment of the shock absorber strip for the child seat distinct from what was previously disclosed, has a lateral extension adjoining the curved section to reduce the distortion of the flat sections that are attached to the inner shell or seat and to the supporting frame. Yet another variation of the Shock Strip (with or without the above enhancement) has a modified width at the end of the curved section to change the twist and bend characteristics. This may be a reduction or increase in the width or the profile of the cross section at different points on the curved section.

Also disclosed are variations of the shock strip under load in side and front impacts. The different cross sections of the front hairpin bend will change the load characteristics of the seat. The support of the sides of the "T" arms are not shown. They may have controlled sliding enabled either in a horizontal plane or also allowing vertical movement, while carefully controlling the deflection characteristics under lateral loading by the arms of the "T" upon side impact.

These disclose "hairpin structure may be implemented in any shock strip and not just the "T" structures.

Finally, there are several embodiments of the child seat with safety considerations noted in this disclosure and those incorporated herein by reference, the inner shell with the head rest, the safety mechanisms noted in these disclosures and the outer shell/safety cage may be a modular structure that can be used in several child seats that can accept the module thereby making the design more versatile.

The child seat embodiments that are disclosed may be a part of complete child seat or may be constructed as a module for use in a child seat base constructed for that purpose. Such a base would have connections at the bottom of the outer shell or cage and in some cases at the back of the outer shell or cage as well.

The embodiment shown has a headrest that may slide up and down on a set of flanges that also retain the head rest in the event of a front impact. Some embodiments may have the harness attached to or threaded through the lower part of the head rest so that movement of the headrest also moves the harness mooring and therefore automatically adjusts the height of the harness based on the height of the headrest. Furthermore, some embodiments may use a threaded bar and nuts on the headrest and the inner shell to move the headrest up and down by rotation of the threaded bar. Such rotation can be achieved with a handle (that may be retracted) at the top of the threaded bar. In some such embodiments the threaded bar is slidably attached to the headrest with a sleeve or other device that prevents axial motion of the threaded rod relative to the headrest. The threaded rod has also one or more nuts that are attached to the inner shell that ride up and down the threaded bar as it is rotated (FIG. 3-7 shows apertures for securing these nuts. The nut rides in a slot in the headrest as in FIG. 3-5). Such motion will move the headrest up and down guided by the flanges sliding in the recesses as shown in the figures. An alternative mechanism is a notched bracket that replaces the threaded bar with a grooved clamp that engages the notches and may be released with a grip mechanism near the top of the headrest. The clamp may be spring loaded and have a pivoted arms on either side of the notched bar, so that on release of the spring the two arms catch the bar on either side. The pivot of the clamp would in some embodiments be attached to the headrest and the notched bar in these embodiments be attached to the inner shell. One handle of the grip will be attached to the headrest and the other will be pivoted to it and have an arm that is substantially parallel to the notched bar, with a lower end pivoted to a point on one of the clamp jaws (or any point that is away from the pivot to give a lever action to move the jaw.) the second clamp jaw may be actuated by the first using any of the abundant background art on such devices.

The flanges may need to be of metal or other strong material particularly if the harness is supported by the headrest in front impact as the inertial loading of the body will act on the harness and in turn on the mounting of the harness with the flanges to the inner shell.

The head rest in some embodiments may be designed to deflect in a controlled manner in a side impact and therefore may have ribs that are designed with a cross section that controls the deflection. Such a cross section may vary along the length of the ribs and the spacings of the ribs may vary to optimize the deflection with regard to lowering head and neck injury.

The shape of some head rests may be such that the surface is inclined on the sides and angled such that the natural motion of the head relative to the upper body with regard to the occipital condoyle and other joints along the spine enable the angle to support the head over a large surface area. This design will help with regard to sleep of the child and also to support the head during a side impact with a distributed reaction force.

The shape of the head rest and the movement of the headrest will enable the headrest to be adjusted upwards until the surface is near the head.

Another feature of this headrest is that it is shaped to avoid covering the eyes to maximize visibility of the child.

The embodiment of the child seat has a support structure between the inner shell and the outer shell/safetycage. This support structure comprises a shock strip at the bottom of the seat that may be extended to the upper part of the inner shell and may even have side arms. Additional supports may be attached at the extreme ends of the side arms (or in the absence of the extension of the shock strip directly on the inner shell in that position) and attached to the outer shell/safety cage. Such attachments may be slidable in a horizontal or vertical and horizontal direction but have a controlled resistance for motion that requires compression of such attachment members. i.e. for lateral movement of the inner shell. There may be additional connections that may be distorted or compressed at different points on the area between the inner and outer shells.

There is also a Bunge sling attachment at the central back of the inner shell and attached to the outer shell. Parts of this are shown in FIG. 3-2. This embodiment has a Bunge Slot that allows the Bunge Pin to slide out during a lateral impact, but captures the pin during a front impact. The dial resistance mechanism will allow different resistances to be applied for front impact control.

Some embodiments of the child seat with an outer shell/safety cage and inner shell or a double shell structure where the double shell in addition to what has been previously disclosed uses a puncture resistant inner shell such as Kevlar and outer shell safety cage that allow deformation or puncture under high reactive forces, thereby minimizing puncture injuries and providing a deceleration space for intruding objects between the inner shell and the outer shell/safety cage.

Embodiments of the child seat that use the double shell (inner and outer as in FIG. 5-1) have great value in several kinds of impact situations as noted in prior disclosures of this invention. In side impacts there is the benefit of relocation and rotation of the inner shell to reduce the peak impact forces and also reorient the child away from the impact. In the case of the front impact there is the relative motion of the inner shell swinging forward substantially with the child strapped in Such a motion will also bring the head further forward than in a child seat that is static. Therefore in designing a resistance arrangement as in the Bunge sling as noted in prior disclosures of the present invention, while the principal design criterion is the minimization of the peak acceleration of the head, such an optimization needs to be done with the forward excursion of the head kept within limits. Therefore in this context it could be a constrained optimization with a limit set for the forward excursion distance.

Notably as the time for the deceleration of the head is increased, and the related space for deceleration rises, the average acceleration can be reduced and also with careful design the peak acceleration reduced. Therefore any reduction of the peak acceleration of the head can be associated with the minimum additional distance for excursion of the head forwards. This minimum incremental head excursion distance will rise as the incremental decrease in the peak acceleration gets bigger. The actual correspondence between the reduction in the peak acceleration and the decrease in the minimum excursion distance will depend on the Bunge device used for such deceleration. Such devices can have different thicknesses. As the thickness rises it reduces the excursion distance as the inner shell needs to be moved forward to accommodate it. Therefore in design it is best to have a thin device to maximize the excursion space for the head. However, the performance of this device will determine if the extent of lowering the peak acceleration is maximum given the available excursion distance. Therefore there is a balance between the thickness of the device and its performance in reducing peak acceleration. The thinner the device and higher the reduction ion peak acceleration (i.e. making the acceleration as close to constant as possible) the better the performance for any given excursion space. One design approach is therefore to start with the given potential excursion space and find the best technology for each thickness of bunge device to minimize the peak acceleration in the available remaining excursion space. Choose the thickness of Bunge device/technology that maximizes the reduction on the peak acceleration within the remaining available excursion space.

Some Bunge devices are designed for multiple parameters such as weights and heights of occupants, different impact pulses at the latch points of the seat where the child seat is installed (depending on the crumple zone) etc. therefore the Bunge device will have a variable performance for each combination of these factors working within the potential excursion distance of which some distance is used by the device. An approach to optimize the space is to find the technology for each thickness of Bunge device that within the remaining excursion space is able to reduce the peak acceleration in the preferred combination (as each value of the parameter will have a minimum for which other combinations of the parameters may not be optimum) Finally choosing the thickness/technology combination that provide the best preferred combination of reduction in peak acceleration.

Oblique frontal or side impacts present unique challenges to the safety of the child in the seat. There is a torque that is applied to the mounting points of the child seat as a result of such an impact. This torque will attempt to rotate the outer shell of the child seat. The architecture of the child seat in FIG. 1 with an inner and outer shell with controlled deflection elements between the two will control the rotation of the inner shell and reduce the peak angular acceleration of the head and other critical body parts and thereby reduce injury. If there is intrusion, contact of the intruding vehicle or object on the outer shell will begin accelerating the inner shell away from the intrusion and as the outer shell is penetrated or deflected. This contrasts with a single shell configuration where the shell is in contact with the child and penetration will cause puncture injuries and deceleration can cause crush injuries as there is no acceleration space for the child to move ahead of the contact with the single shell.

The invention has a head rest that may be in some embodiments moved up and down to accommodate the growth of the child. The Head rest may also have attachments for the harness that also moves with the head rest. Moreover the headrest may also have shoulder guards that can move with the headrest and are attached thereto. Such shoulder guards may be braced with other parts of the CRS. In the case of a CRS with a outer shell and a dynamic inner shell such bracing may be with the inner shell to benefit from the dynamics of the inner shell as well.

In any of these embodiments the invention further has aircushions that are filled with air or other fluid and are either fully or partially filled with a porous material. These aircushions in some embodiments have vents that differentially evacuate the body of the aircushions so that the edge of the aircushion in front of the child's head will evacuate last so that the head is ensconced by the air cushion and the center and lower part of the air cushions evacuate first. The porous materials that may be used to fill the aircushions can change the compression characteristics of the aircushion. The fluid mechanics would dictate that such an arrangement could be effected with vents at the lower end of the air cushions as shown in the figures. Some embodiments may have air cushions shaped as in the figures. the narrowing cross sections near the bottom or the vents can be used also with a venturi tube to control the rate of evacuation without introducing excessive turbulence. The vents can of course be sized to control the evacuation.

In other embodiments may have a sacrificial airbag that is partially deflated under impact loading, and as a result transferring the air to the air cushions. Such an arrangement can have the sacrificial airbags attached to the shoulder supports and upon contact.

Upon contact of the shoulders on the sacrificial airbag, air is forced through the air ducts to the air cushions placed on the head rest. These ducts may be oriented as best suited for transferring the air in a timely fashion and to the right locations in the air cushions. The embodiments show the air ducts conducting the air to the heads of the air cushions so that the inflation of the heads of the cushions are effected first. Thereafter contact of the head on the air cushions will deflate the air cushions through the vents.

Notably there may be secondary vents on the aircushions to control evacuation of the air cushions.

Such airbags and aircushion (and the air ducts if used) may be constructed with two layers of wall material that sandwich a porous material, and the entire combination compressed selectively at the sections that lie between the airbags and aircushions with a die that may be heated. Thereby creating the shape of the airbags and cushions as needed. Another approach will be to have cut outs of the porous material that match the die shape and compress the two layers of wall material to be in contact with each other and sandwich the sections of the porous material, the wall material and the porous material may be treated for adhesion or melting as required to create the necessary seals.

The vent holes in the aircushions may be engineered to have flaps that that can be moved over the aperture to change the venting properties to calibrate the rate of evacuation under different impact conditions. For example in side impact, for cars with softer side structures the optimal venting may be different to cars with stiffer side structures. A system of aircushions can therefore be created to be calibrated on site to best protect the occupant in the car of choice by moving the flat over the vent to the right positions.

Another aspect of the invention is the use of a Belt-Box (buckle) to tension the car seat belt with regard to the CRS. The belt-box in some embodiments is slidably attached to the side member of the base of the CRS and has a cable attachment to the tensioning mechanism for the CRS latch arrangements. The Belt-box has a loop of the pair of webbing sections that come from the seat belt buckle end, passing through a slot. The loop then engages a pin that may be withdrawn to release the loop if needed. The pin would normally be locked in place during operation. The pin slides in a short slot on the body of the belt-box and the position and orientation of the slot is such that as the pin slides into the box as would happen under tension of the seat belt in a front impact, the pin also moves laterally towards a rough surface of the belt box that impedes slippage of the belt. Thereby maintaining in the position if the CRS as with little movement of the webbing of the seat belt.

Another aspect of the invention is an apparatus that is used for testing impact conditions on the CRS and for that matter any other test where a variable compression loading is required where the first stage of compression has a higher loading force and the subsequent stages of compression have lower forces. Notably in the case of a series of spring dampers or honey comb, the first to compress will be the section with the lowest resistance and therefore when the requirement is for compression of the highest resistance first a special apparatus as disclosed herein is required. Here the support arms protect the lower compression sections until the pins release the support arms and thereafter the softer material gets compressed. The arrangement in the apparatus can be cascaded for multiple sections of increasingly softer spring dampers or honeycomb with pairs of pins and support arms on adjoining pairs of plates that release these sections for compression.

As shown in FIGS. 7-1 to 7-7, the invention has a mechanism for the attachment of a headrest (that may include the support for the harness and may include shoulder lateral supports) to the shell supporting the occupant in a CRS. This mechanism has many embodiments, the one illustrated in the figures has one or more pins that are enabled to insert into slots at different height positions of the headrest thereby providing a locking mechanism for the headrest at these heights to accommodate children of different heights.

The height control slider that retracts and re-engages the pins through the attachment by pivoted links (other embodiments may have other linking mechanisms to attach a height control device to the pins,) the height control slider is attached to a trigger or a lever that can be raised relative to a handle attached to the headrest, to elevate the slider relative to the headrest and thereby release the pins from the slots. The slider may be attached to a spring to maintain the engaged position as the normal position.

The slots in the embodiment shown are constructed to be on the sliding flange that is attached to the shell and the pins are part of the mechanism that is attached to the headrest. This arrangement can be reversed so that the slots are on the headrest (flange or other part) and the pins are attached to the shell. In the first case the mechanism will be operated from the headrest as it moves up and down, whereas in the second case the mechanism will be operated from the back of the shell.

The Figures show the means of articulation of the pints into the slots with a slider that is attached to the pivoted links which are in turn attached to the pins. An alternative approach would be to have the pins move in an arc into and out of the housing with a pivotal support and directly or indirectly attached to the slider.

The headrest needs to be supported by the shell. This support is enabled with the set of sliding interleaved flanges attached to each of the shell and the headrest. These flanges are attached to respectively the headrest and the shell along a spine that is wide enough to provide the space for the flange attached to the other member—headrest or shell.

In the embodiment shown the slots are on the edge of the flange attached to the shell. This need not be the case. The slots may be on any part of the shell that is adjoining a part of the headrest that is chosen to mount the pins. The pins should of course move along a known path adjoining the slots during the motion of the headrest up and down.

Another aspect of the CRS invention as shown in FIG. 7-8, 7-9 is a mechanism for the accommodation of extreme intrusion into the space of the CRS during side impact. The CRS in this Fig shows an outer shell (which contains the inner shell supporting the child. The invention will also be applicable to a single shell instead of the outer shell shown here) that is pivoted along its back and has limited rotational motion about this axis that is normally enabled for egress and ingress. It is locked in position for normal operation of the vehicle to protect the child in a side impact. However this invention enables the clasp that holds the outer shell to collapse under a predefined extreme loading of the intrusion to allow the outer shell to rotate about the central axis thereby moving the child away from and reorienting the child away from the intrusion and the impact (FIG. 7-8). In extreme cases where the intrusion is severe this movement is not sufficient, the invention has a pivot that detaches or moves so that the outer shell can be pushed further by the intruding objects.

These two inventions allow the secure mounting of the child seat to the vehicle for optimal performance under less severe impact conditions and also minimizes the size of the intruding child seat into the space of the adjoining passenger thereby reducing potential injury to that passenger.

Yet another aspect of the CRS invention as shown in FIG. 7-10, is an enhanced support for the CRS relative to the car seat. It has either a plurality of straps or a fabric/continuous material that is/are anchored to a bar that is on the back of the seat which in turn is attached to the anchor point of the vehicle for the tether. The stretch bar keeps the fabric or the set of straps separated and thereby gives a significant frictional bonding between the fabric or the set of straps and the seat back to support the top of the seat in side impacts. The fabric or continuous version of this aspect of the invention will also support shear loads that will further add to the support of the CRS under lateral loading. The strap embodiment can be enhanced with "X" diagonal sections of straps between adjoining section of orthogonal or direct straps between the back of the seat and the stretch bar to support shear loadings as well by diagonal support of the two ends in sections that are a substitute for the shear planes as in the case of the fabric embodiment.

Yet another aspect of the invention is shown in FIG. 7-11, here the CRS that has a inner shell supporting the occupant and an outer shell that is attached to the inner shell through shock absorbing elements. Previous disclosures of this invention have used a shock strip supporting the bottom of the inner shell and "fingers" supporting the upper sides of the inner shell and a Bunge sling or a Dial-A-Guard element providing support for forward impact movement of the inner shell. The present embodiments may have all these aspects of the support but rather than the "fingers" they are supported by a pair of side shock strips—one on each side—that may be made of metal. These side shock strips (or the curved ends of the cradle) may engage the inner shell in two ways: they may extend around the back of the inner shell and cradle the inner shell; second some embodiments may simply have a short section of the shock strip hugging the inner shell and constrained to move in a depression or groove along its length to allow sliding. The functions of the side shock strip may include the constraining of the motion of the inner shell when rotating within the outer shell. In the case of the cradle type attachment, the near parallel opposite sides of the side shock strip will constrain relative motion between the inner and outer shell to be along the direction of the parallel sides as the "curve" of the shock strip moves along the strip as the strip deforms. It however will not easily allow the relatively parallel edges to move orthogonal to the strip by twisting the curve between the parallel sides of the strip. The same holds for the second means of attachment but in addition there may be some sliding of the strip riding in the groove on the inner shell.

There may be in addition as shown an optional supplementary shock strip "curve" that can absorb lateral impacts. Notably if the side shock strip is designed for deformation as the rotation of the inner shell progresses it would be helpful to have a second strip that accommodates the design parameters for compression in lateral impact.

FIG. 7-12, shows a "split" shock strip at the bottom support of the inner shell. This will change the deformation characteristics of the shock strip. Such a split shock strip may also be used on the lateral or side shock strips as in FIG. 7-11.

Further embodiments of the CRS have the inner shell supported at the rear of the shell relative to a bottom surface of the outer shell and related structure to limit downward motion of the inner shell relative to the outershell during side or front impact. A wide support structure may be used for reducing the rocking motion about a forward axis during a side impact. Such support structures are attached to one of either the innershell or the outershell and slidable on the other of these elements.

WorkMate/Surgeon Back Saver/Posture Enabling Device

Another embodiment of the WorkMate relative to the previously disclosed versions is as in FIG. 1-11, 1-12. It is designed to help workers who bend Forward to work. In this embodiment, the device senses the position of the hips relative to the vertical from the feet and the device attempts to keep the hips at a predefined position relative to the vertical above the feet. Different users will have a different preferred relative position. However, broadly, most users would like to keep the center of gravity of the hips vertically above the feet so that the spinal loading is vertical and lateral loadings and resulting long term injury is prevented in repetitive and extended periods of work with the upper body locating away from the vertical above the hips. The invention has a support arm that supports the upper body. It is simply strapped or otherwise attached to the upper body so that when the upper body is bent forward the hips automatically relocate to behind the vertical above the feet to maintain balance. The invention thereafter moves the control arm away from the vertical so that it counterbalances the upper body and allows the body to relocate the hips above support footprint of the feet. The servo control in this embodiment uses the distance between the preferred location in the support foot print of the feet relative to the vertical through the hips as the error signal and moves the control arm 11D to reduce this error. The wearer of the invention will automatically readjust the hip position to maintain balance as the control arm moves and therefore in equilibrium, the control arm will be at the position where it counterbalances the upper body while still allowing the hips to lie above the feet. The invention, simply by providing this counterbalance will provide a force on the upper body that will support it to the extent that there is minimal horizontal loading on the spine and its appendages.

The locations of the feet and the hips relative to each other may be establishes using wireless devices that are attached to the feet and/or to the control unit and the anchor belt 11C. This will allow the measurement of the horizontal position of a predetermined point within the support footprint of the feet relative to a predetermined point within the circumference of the hips. Such sensors can use wireless technologies with sensors attached to the feet and on the anchor belt 11C.

11A is a support arm; 11B is a support belt that keeps the support arm next to the user's upper body. 11C is the anchor belt that attaches above the hips of the user; 11D is the control arm that can have length and angular displacements of the weight at its end to counterbalance as noted above.

FIG. 1-12 is a schematic that shows the mass of the upper body M1 and the control arm M2 that counterbalance each other M2's angular and/linear distance being controlled by a servo that uses as its error signal the vertical displacement between X1 and X2. The movement of X2 happens as the user maintains balance.

The invention claimed is:

1. A two-tiered occupant support in an aircraft with an axis along its length, and with a cabin with an aisle along said axis serving both tiers of said two tiered occupant support, wherein said two tiered occupant support comprises:
an upper tier and a lower tier,
Wherein the upper and lower tiers are oriented to face occupants towards the aisle in at least one sitting position;
Wherein each of the occupants have direct egress and ingress access to the aisle; and
a storage space beneath the lower tier utilized for storage for said occupants:
wherein said storage space has a front surface facing and directly adjacent to the aisle;
wherein said storage space comprises a bottom support surface that may be drawn out into the aisle for access to stored contents;
thereby providing an efficient use of cabin space in the vehicle.

2. The two-tiered occupant support in an aircraft with a cabin with an aisle as in claim 1, wherein the support surface that may be drawn out into the aisle for access has a movable belt that is enabled to move stored items along said belt to a position above the rear of the support surface.

3. The two-tiered occupant support in an aircraft with a cabin with an aisle as in claim 2, wherein the belt is constructed as an endless loop with one or both of rollers and slides at the front and back of the belt.

4. The two-tiered occupant support in an aircraft with a cabin with an aisle as in claim 2, wherein the belt is constructed as an endless loop with one or both of rollers and slides below the upper section of said loop, enabled to support a load placed on the belt.

5. The two-tiered occupant support in an aircraft with a cabin with an aisle as in claim 1:
wherein the occupant spaces of occupants on the upper tier are displaced laterally relative to the occupant facing direction of the occupant spaces on the lower level such that each of said upper tier occupant spaces lie partially above each of a first lower tier occupant space and a second lower tier occupant space;
wherein the occupant space of each of the lower tier of occupants has a ceiling as an upper boundary that has a substantially orthogonal front edge to the direction of the occupant;
wherein at least one of the upper tier of occupants has a plurality of positions comprising a sitting position and a reclining position;
wherein, the sitting position of said upper tier occupant requires a foot space of said occupant space, with a lower boundary of said foot space below the ceiling of at least one of the occupant spaces in the lower level;
an enabling architecture of said structure that staggers the occupant spaces on each of the two levels such that the front edge of the adjoining occupant space is displaced backwards on a first side and displaced forward on a second side relative to the sitting position of occupants for each of the occupant spaces, thereby enabling for the upper tier occupant space, a foot space in front of the lower tier occupant space on the first side of the upper tier occupant support, while utilizing the space above the occupant space on the lower level on the second side of the upper tier occupant support, for a reclining space at or above the ceiling of the lower occupant space beneath.

6. The two-tiered occupant support in an aircraft with a cabin with an aisle as in claim 5, wherein as a result of the staggered architecture, the upper tier occupant space lies partially above a first lower tier occupant space on the first side of the upper tier occupant space and partially above a second lower tier occupant space on the second side of the upper tier occupant space further comprising steps for egress and ingress to at least one of the upper tier occupant spaces, mounted at the front of the second side of the first lower tier occupant space thereby said steps being located substantially below the foot space of said upper tier occupant space and utilizing an additional space from the forward displace front edge on the second side of the first lower tier occupant space.

7. The two-tiered occupant support in an aircraft with a cabin with an aisle as in claim 6, wherein the foot space of an upper tier occupant space, has a back boundary and a bottom boundary, and wherein an integrated leg support and foot rest (FIG. 1-1, 1-9, 1-10, 1-11) is enabled to substantially follow these boundaries in a first orientation where it is enabled to support the occupants feet, and wherein said foot rest is displaced laterally towards the first side of said upper tier occupant space, and wherein said foot rest is enabled to rise and reorient to a second orientation to support the occupant's legs and lie above the ceiling of the first lower tier occupant space.

8. A two-tiered occupant support in an aircraft with a cabin with the aisle as in claim 1, comprising an occupant space with a front boundary adjoining the aisle, and with a seat bottom with a reclining position and a sitting position;
wherein said aisle is substantially orthogonal to the occupant space; and
wherein said aisle is prescribed to have predefined widths at predefined levels;
thereby limiting a position of said front boundary of said occupant space at those levels, and:
wherein each of the positions of the seat bottom has a height and a horizontal displacement relative to a reference point on the edge of the aisle; and
wherein the seat bottom has a first leg rest attached thereto, and an extending second leg rest, slidably attached to and movable relative to the seat bottom to extend the first leg rest utilizing the height and the horizontal location of the seat bottom to increase the occupant space towards the aisle at the prescribed width for a plurality of heights of the seat bottom.

9. A two-tiered occupant support in an aircraft with a cabin with an aisle as in claim 8, further comprising a fixed element of the occupant support, and wherein the extending second leg rest is slidably attached to the seat bottom, and wherein an actuation of said extending second leg rest is enabled with a pin attached to the extending second leg rest engaged to a slot of a predetermined shape and orientation, attached to the fixed element (FIG. 4-2), whereby motion of the seat bottom relative to the fixed element moves the pin in the slot which enables horizontal movement of the extending second leg rest relative to the seat bottom, thereby extending the occupant space towards the aisle within the prescribed width at said plurality of heights.

10. The two-tiered occupant support in an aircraft with a cabin with an aisle as in claim 1 with occupants facing the aisle, wherein the each occupant support comprises a seat back and seat bottom:
   wherein a base of the seat back is supported by a first end of an arm substantially orthogonal to the surface of the seat back; and
   wherein a second end of said arm is pivotally attached to the vehicle about a first pivot; and
   wherein said seat bottom is pivotally attached to the first end of said arm about a second pivot (FIG. 1-1, 1-9, 1-10, 1-11),
wherein the rotational motion of the arm thereby resulting in variation in the angle of the seat back and the position of the rear end of the seat bottom, said first pivotal support of the second end of the arm on the vehicle further comprising an actuation mechanism to displace said first pivot thereby providing an additional degree of freedom for the orientation and position of the seat back and bottom.

\* \* \* \* \*